(12) United States Patent
Johnson et al.

(10) Patent No.: US 8,932,424 B2
(45) Date of Patent: Jan. 13, 2015

(54) PAINT FILM COMPOSITES AND METHODS OF MAKING AND USING THE SAME

(75) Inventors: Michael A. Johnson, Stillwater, MN (US); Frank A. Brandys, L'lle-Bizard (CA); Kent E. Nielsen, Dorchester (CA); Charlie C. Ho, Woodbury, MN (US); Vijay Rajamani, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 313 days.

(21) Appl. No.: 12/934,038

(22) PCT Filed: Mar. 18, 2009

(86) PCT No.: PCT/US2009/037466
§ 371 (c)(1),
(2), (4) Date: Sep. 22, 2010

(87) PCT Pub. No.: WO2009/120547
PCT Pub. Date: Oct. 1, 2009

(65) Prior Publication Data
US 2011/0027594 A1      Feb. 3, 2011

Related U.S. Application Data

(60) Provisional application No. 61/039,212, filed on Mar. 25, 2008.

(51) Int. Cl.
*B29C 37/00* (2006.01)
*B29C 65/64* (2006.01)
(Continued)

(52) U.S. Cl.
CPC .............. *B32B 37/15* (2013.01); *B32B 15/08* (2013.01); *B32B 27/06* (2013.01); *B32B 37/206* (2013.01); *B32B 37/003* (2013.01); *B32B 2307/718* (2013.01); *B32B 2309/02* (2013.01); *B32B 2309/105* (2013.01); *B32B 2310/0887* (2013.01); *B32B 2375/00* (2013.01); *B32B 2605/00* (2013.01)
USPC ........... 156/232; 156/237; 156/238; 156/247; 156/307.1; 156/307.3

(58) Field of Classification Search
USPC ......... 156/230–232, 235, 237, 238, 241, 242, 156/247, 295, 307.1, 307.3; 428/31, 40.1, 428/41.6, 41.7, 41.8, 42.1, 42.3
See application file for complete search history.

(56) References Cited

U.S. PATENT DOCUMENTS 3,436,359 A    4/1969   Hubin
3,551,232 A    12/1970  Thompson
(Continued)

FOREIGN PATENT DOCUMENTS

CN    1061980 A    6/1992
DE    1 704 840    6/1971
(Continued)

OTHER PUBLICATIONS

A. M. Kaminski and M. W. Urban, "Interfacial Studies of Crosslinked Polyurethanes; Part 1. Quantitative and Structural Aspects of Crosslinking and Near Film-Air and Film-Substrate Interfaces in Solvent-Borne Polyurethanes", Journal of Coatings Technology, vol. 69, No. 872, Sep. 1997, pp. 55-66.

(Continued)

*Primary Examiner* — Sing P Chan
(74) *Attorney, Agent, or Firm* — Bradford B. Wright; Philip P. Soo

(57) ABSTRACT

Paint film composites comprise sheet metal, a color layer, and an optional transparent protective layer. Methods of making and using the paint film composites, and shaped articles made thereby, are also disclosed.

5 Claims, 2 Drawing Sheets

(51) Int. Cl.
*B44C 1/17* (2006.01)
*B32B 37/14* (2006.01)
*B32B 37/22* (2006.01)
*B32B 37/26* (2006.01)
*B32B 38/10* (2006.01)
*B32B 38/14* (2006.01)
*B32B 43/00* (2006.01)
*C08J 5/12* (2006.01)
*B32B 37/15* (2006.01)
*B32B 15/08* (2006.01)
*B32B 27/06* (2006.01)
*B32B 37/20* (2006.01)
*B32B 37/00* (2006.01)

(56) References Cited

U.S. PATENT DOCUMENTS

| | | |
|---|---|---|
| 3,728,182 A | 4/1973 | Wisotzky et al. |
| 4,457,797 A | 7/1984 | Hatchadoorian et al. |
| 4,522,670 A | 6/1985 | Caines |
| 4,569,885 A | 2/1986 | Yamaguchi et al. |
| 4,590,021 A | 5/1986 | Ota et al. |
| 4,642,126 A | 2/1987 | Zador |
| 4,652,274 A | 3/1987 | Boettcher |
| 4,769,100 A | 9/1988 | Short et al. |
| 4,810,540 A | 3/1989 | Ellison et al. |
| 4,824,506 A | 4/1989 | Hoerner et al. |
| 4,828,637 A | 5/1989 | Mentzer et al. |
| 4,833,213 A | 5/1989 | Leir et al. |
| 4,838,973 A | 6/1989 | Mentzer et al. |
| 4,902,557 A | 2/1990 | Rohrbacher |
| 4,913,760 A | 4/1990 | Benson et al. |
| 4,933,237 A | 6/1990 | Krenceski et al. |
| 5,021,981 A | 6/1991 | Swartzel et al. |
| 5,034,275 A | 7/1991 | Pearson |
| 5,037,681 A | 8/1991 | Yada et al. |
| 5,114,789 A | 5/1992 | Reafler |
| 5,128,434 A | 7/1992 | Lai |
| 5,132,148 A | 7/1992 | Reafler |
| 5,192,609 A | 3/1993 | Carroll, Jr. |
| 5,201,984 A | 4/1993 | Whiteside |
| 5,215,811 A | 6/1993 | Reafler et al. |
| 5,252,694 A | 10/1993 | Willett et al. |
| 5,324,382 A | 6/1994 | Whiteside |
| 5,405,675 A | 4/1995 | Sawka et al. |
| 5,410,791 A | 5/1995 | Wirth et al. |
| 5,410,971 A | 5/1995 | Golden et al. |
| 5,417,726 A | 5/1995 | Stout et al. |
| 5,449,429 A | 9/1995 | Langenbrunner |
| 5,468,532 A | 11/1995 | Ho et al. |
| 5,591,527 A | 1/1997 | Lu |
| 5,607,536 A | 3/1997 | Tikka |
| 5,648,136 A | 7/1997 | Bird |
| 5,707,697 A | 1/1998 | Spain et al. |
| 5,729,963 A | 3/1998 | Bird |
| 5,798,409 A | 8/1998 | Ho |
| 5,900,093 A | 5/1999 | Langenbrunner |
| 5,951,939 A | 9/1999 | Chernyak et al. |
| 5,960,527 A | 10/1999 | Ellison et al. |
| 5,968,657 A | 10/1999 | Scullin et al. |
| 5,972,279 A | 10/1999 | Harris et al. |
| 5,985,198 A | 11/1999 | Harris et al. |
| 6,012,818 A | 1/2000 | Araki |
| 6,083,335 A | 7/2000 | Scullin et al. |
| 6,143,227 A | 11/2000 | Heiden et al. |
| 6,164,739 A | 12/2000 | Schulz et al. |
| 6,221,304 B1 | 4/2001 | Harris et al. |
| 6,254,712 B1 | 7/2001 | Enlow et al. |
| 6,258,918 B1 | 7/2001 | Ho et al. |
| 6,284,183 B1 | 9/2001 | Roys et al. |
| 6,336,988 B1 | 1/2002 | Enlow et al. |
| 6,367,361 B1 | 4/2002 | Christensen et al. |
| 6,440,546 B1 | 8/2002 | Fields et al. |
| 6,468,643 B1 | 10/2002 | Kanbayashi et al. |
| 6,492,012 B1 | 12/2002 | Shah |
| 6,521,145 B1 | 2/2003 | Engler et al. |
| 6,547,912 B2 | 4/2003 | Enlow et al. |
| 6,607,831 B2 | 8/2003 | Ho et al. |
| 6,623,667 B2 | 9/2003 | Lundin |
| 6,635,314 B1 | 10/2003 | William et al. |
| 6,667,101 B2 | 12/2003 | Silagy et al. |
| 6,676,754 B1 | 1/2004 | Fleming et al. |
| 6,709,723 B2 | 3/2004 | Roys et al. |
| 6,709,748 B1 | 3/2004 | Ho et al. |
| 6,723,427 B1 | 4/2004 | Johnson et al. |
| 6,773,804 B2 | 8/2004 | Enlow et al. |
| 6,838,130 B1 | 1/2005 | Spain |
| 6,890,658 B2 * | 5/2005 | Egashira .................... 428/425.5 |
| 6,933,006 B2 * | 8/2005 | Fey et al. ...................... 427/146 |
| 6,966,962 B2 | 11/2005 | Spain et al. |
| 6,984,280 B2 | 1/2006 | Spain et al. |
| 7,132,142 B2 | 11/2006 | Truog et al. |
| 7,144,612 B2 | 12/2006 | LaFave et al. |
| 7,195,727 B2 | 3/2007 | Sienkiewicz et al. |
| 8,128,779 B2 * | 3/2012 | Ho et al. ......................... 156/277 |
| 2003/0175488 A1 | 9/2003 | Asthana et al. |
| 2004/0076766 A1 | 4/2004 | Fey et al. |
| 2004/0209057 A1 | 10/2004 | Enlow et al. |
| 2004/0224101 A1 | 11/2004 | Johnson |
| 2004/0234771 A1 | 11/2004 | Meyer et al. |
| 2007/0034326 A1 | 2/2007 | Kikuchi et al. |
| 2007/0116903 A1 | 5/2007 | Song et al. |
| 2007/0122630 A1 | 5/2007 | Worthen |
| 2007/0128365 A1 | 6/2007 | Koch et al. |
| 2007/0141264 A1 * | 6/2007 | Satgurunathan et al. ..... 427/384 |
| 2007/0256597 A1 * | 11/2007 | Rukavina et al. ........ 106/287.25 |
| 2008/0199704 A1 | 8/2008 | Ho et al. |
| 2008/0311349 A1 | 12/2008 | Johnson et al. |
| 2010/0032082 A1 | 2/2010 | Ho et al. |
| 2011/0027594 A1 | 2/2011 | Johnson et al. |
| 2011/0045306 A1 | 2/2011 | Johnson et al. |

FOREIGN PATENT DOCUMENTS

| | | | |
|---|---|---|---|
| EP | 230364 A2 * | 7/1987 | ............... B05D 1/00 |
| EP | 0 392 847 A2 | 10/1990 | |
| EP | 1 099 542 A1 | 5/2001 | |
| EP | 1 125 730 A2 | 8/2001 | |
| EP | 1 743 764 A2 | 1/2007 | |
| FR | 2 790 424 A1 | 9/2000 | |
| JP | S61-26612 | 2/1986 | |
| JP | S61-26615 | 6/1986 | |
| JP | S63-64739 | 3/1988 | |
| JP | S63-183838 | 7/1988 | |
| JP | H03-505308 | 11/1991 | |
| JP | 05-155976 A | 6/1993 | |
| JP | H09-29891 | 2/1997 | |
| JP | 2001-129927 | 5/2001 | |
| JP | 2001-187362 A | 7/2001 | |
| JP | 2002-103517 | 4/2002 | |
| JP | 2002-307625 | 10/2002 | |
| JP | 2003-001648 A | 1/2003 | |
| JP | 2003-165930 | 6/2003 | |
| JP | 2003-165930 | 6/2003 | |
| JP | 2004-115681 | 4/2004 | |
| JP | 2005-133013 A | 5/2005 | |
| JP | 2005-179422 | 7/2005 | |
| JP | 2006-88651 | 4/2006 | |
| JP | 2007-136679 A | 6/2007 | |
| JP | 2007-297569 A | 11/2007 | |
| JP | 2008-023854 | 2/2008 | |
| WO | WO 89/04257 A1 | 5/1989 | |
| WO | WO 89/10260 | 11/1989 | |
| WO | WO 93/21014 A1 | 10/1993 | |
| WO | WO 94/29127 A1 | 12/1994 | |
| WO | WO 96/40480 A1 | 12/1996 | |
| WO | WO 97/20642 A1 | 6/1997 | |
| WO | WO 97/22420 A1 | 6/1997 | |
| WO | WO 97/22421 A1 | 6/1997 | |
| WO | WO 97/46377 A1 | 12/1997 | |
| WO | WO 97/48776 A1 | 12/1997 | |
| WO | WO 99/08870 A1 | 2/1999 | |
| WO | WO 00/18516 A2 | 4/2000 | |

(56) References Cited

FOREIGN PATENT DOCUMENTS

| | | |
|---|---|---|
| WO | WO 00/32680 A1 | 6/2000 |
| WO | WO 00/33975 A2 | 6/2000 |
| WO | WO 01/26874 A1 | 4/2001 |
| WO | WO 02/00448 A2 | 1/2002 |
| WO | WO 03/018284 A1 | 3/2003 |
| WO | WO 03/060020 A1 | 7/2003 |
| WO | WO 03/095237 A1 | 11/2003 |
| WO | WO 2004/003049 A1 | 1/2004 |
| WO | WO 2004/073967 A2 | 9/2004 |
| WO | WO 2004/074386 A2 | 9/2004 |
| WO | WO 2004/089589 A1 | 10/2004 |
| WO | WO 2005/011958 A1 | 2/2005 |
| WO | WO 2005/047058 A2 | 5/2005 |
| WO | WO 2006/069015 A1 | 6/2006 |
| WO | WO 2006/102581 A1 | 9/2006 |
| WO | WO 2007/059282 A1 | 5/2007 |
| WO | WO 2007/067523 A1 | 6/2007 |
| WO | WO 2008/039658 A2 | 4/2008 |
| WO | WO 2008/039659 A2 | 4/2008 |
| WO | WO 2008/042883 A2 | 4/2008 |
| WO | WO 2009/011989 A1 | 1/2009 |
| WO | WO 2009/012079 A2 | 1/2009 |

OTHER PUBLICATIONS

C. H. Fridley, "Focus: Automotive Painting/Powder Coating: Another Way to Paint Plastics", Products Finishing, Apr. 1992, pp. 72-77.

T. S. Wilson et al., "Shape Memory Polymers Based on Uniform Aliphatic Urethane Networks", Journal of Applied Polymer Science, Jun. 2007, vol. 103, pp. 540-551.

A. Lendlein and S. Kelch, "Shape-Memory Polymers", Angewandte Chemie, Int. Ed., 2002, vol. 41, pp. 2034-2057.

International Search Report, PCT/US2009/037466, mailed Aug. 19, 2010, 4 pages.

Written Opinion of the International Searching Authority, PCTUS2009/037466, mailed Aug. 19, 2010, 9 pages.

Catalogue of fine Chemical Products, vol. 2, Dec. 31, 2003 p. 811.

Co-pending U.S. Appl. No. 14/016,711, entitled "Multilayer Articles and Methods of Making and Using the Same", Johnson et al., filed Sep. 3, 2013.

\* cited by examiner

PAINT FILM COMPOSITES AND METHODS OF MAKING AND USING THE SAME

CROSS-REFERENCE TO RELATED APPLICATIONS

This application is a national stage filing under 35 U.S.C. 371 of PCT/US2009/037466, filed Mar. 18, 2009, which claims priority to U.S. Provisional Application No. 61/039,212, filed Mar. 25, 2008, and the disclosure of which is incorporated by reference in its entirety herein.

BACKGROUND

It is common practice to decorate the surface of manufactured articles to create an aesthetically pleasing look for the product. This has traditionally been accomplished through the use of liquid paints, typically containing solvents that evaporate from the paint leaving behind the solids in the form of a uniform film that decorates the surface of the article.

Traditional vehicle assembly methods typically include a spray painting step to paint visible vehicle parts and provide a protective and aesthetic appealing outer surface. However, the process of spray painting is time-consuming and generally involves volatile organic solvents that present special handling and/or environmental issues.

The transportation industry has sought to reduce solvents in vehicle assembly plants through the development and use of decorative colored films, known in the art as "paint films". The original idea behind paint film was to utilize a conventional paint, which would simply be coated onto a liner and dried. The liner would then be releasably removed from the paint film which would then be applied to, for example, a three-dimensionally shaped vehicle body part. However, achieving a high quality application (for example, free of wrinkles and/or puckers) remains a serious concern with paint films, especially if applied to large or severely contoured surfaces.

There are two predominant techniques used to manufacture paint films: (1) solution-casting; and (2) extrusion. Each of these processes typically requires the use of elevated temperature (120° C. to 250° C. or more) to either evaporate the solvent (solution casting) or to melt the polymer (extrusion). Such temperatures are prone to thermally inducing shifts in color and other appearance properties of paint films, making color and appearance matching difficult to achieve.

High gloss and high image clarity are among the most common requirements for automotive finishes. While solvent based paints are typically capable of acceptable appearance, colored extruded plastic films fall well short of achieving a desirable rich "wet-look". In order to improve the appearance of paints, a transparent clear coat (commonly known as a clear coat) is known to be applied onto the colored paint (commonly known as a base coat). Similarly, paint films may have a transparent clear layer supported on a colored base layer.

If paint films are applied to three-dimensional shaped vehicle parts problems may be encountered such as, for example, stretching, wrinkling, and/or puckering of the paint film during application that renders the finished body parts aesthetically, and possibly functionally, unsuitable. These problems may be made even worse by molecular orientation of the paint film (for example, during extrusion) such that stretchability of the paint film varies with film orientation.

SUMMARY

In one aspect, the present disclosure provides a paint film composite comprising:

unpainted sheet metal stock; and an opaque or translucent color layer comprising a colorant and a thermoset polymeric material, the color layer having a first major surface contacting and permanently adhered to the unpainted sheet metal stock, the color layer having a second major surface opposite its first major surface, and the color layer being substantially solvent-free.

In another aspect, the present disclosure provides a paint film composite comprising:

unpainted sheet metal; and an opaque or translucent color layer comprising a colorant and a thermoset polymeric material, the color layer having a first major surface contacting and permanently adhered to the unpainted sheet metal, the color layer having a second major surface opposite its first major surface, and each of the first and second major surfaces of the color layer being a substantial inverse image of a major surface of first and second respective corresponding forming webs.

In another aspect, the present disclosure provides a paint film composite comprising:

unpainted sheet metal;

an adhesive layer; and an opaque or translucent color layer permanently adhered to the unpainted sheet metal by the adhesive layer, the color layer comprising a colorant and a thermoset polymeric material, the color layer having a first major surface contacting the adhesive layer, the color layer having a second major surface opposite its first major surface, and the color layer being substantially solvent-free.

In another aspect, the present disclosure provides a paint film composite comprising:

unpainted sheet metal;

an adhesive layer; and an opaque or translucent color layer permanently adhered to the unpainted sheet metal by the adhesive layer, the color layer comprising a colorant and a thermoset polymeric material, the color layer having a first major surface contacting the adhesive layer, the color layer having a second major surface opposite its first major surface, and each of the first and second major surfaces of the color layer being a substantial inverse image of a major surface of first and second respective corresponding forming webs.

In certain embodiments, the thermoset polymeric material is selected from the group consisting of silicones, polyethers, acrylics, polyurethanes, and combinations thereof. In certain embodiments, the thermoset polymeric material comprises a polyurethane. In certain embodiments, the polyurethane has hard segments in an amount of from 30 to 70 percent by weight.

In another aspect, the present disclosure provides a paint film composite comprising:

unpainted sheet metal; and an opaque or translucent color layer comprising a colorant and a polymeric material, the color layer having a first major surface contacting and permanently adhered to the unpainted sheet metal, the color layer having a second major surface opposite its first major surface, and the color layer being substantially isotropic and essentially solvent-free.

In another aspect, the present disclosure provides a paint film composite comprising:
unpainted sheet metal;
an adhesive layer; and
an opaque or translucent color layer permanently adhered to the unpainted sheet metal by the adhesive layer, the color layer comprising a colorant and a polymeric material, the color layer having a first major surface contacting the adhesive layer, the color layer having a second major surface opposite its first major surface, and the color layer being substantially isotropic and substantially solvent-free.

In certain embodiments, the polymeric material is selected from the group consisting of silicones, polyethers, acrylics, polyurethanes, and combinations thereof. In certain embodiments, the polymeric material comprises a polyurethane. In certain embodiments, the polyurethane has hard segments in an amount of from 30 to 70 percent by weight.

In certain embodiments, the second major surface of the color layer exhibits surface shape recovery.

In certain embodiments, paint film composites according to the present disclosure further comprise a transparent protective layer having a first major surface and a second major surface opposite its first major surface, the first surface of the transparent protective layer contacting and permanently adhered to the second major surface of the color layer.

In certain embodiments, paint film composites according to the present disclosure further comprise a protective liner releasably adhered and contacting either the second major surface of the color layer or, if present, the second major surface of the transparent protective layer.

In another aspect, the present disclosure provides a paint film composite comprising:
unpainted sheet metal;
an opaque or translucent color layer having a first major surface contacting and permanently adhered to the unpainted sheet metal, the color layer having a second major surface opposite its first major surface, and the color layer comprising a colorant and a first polymeric material; and
a transparent protective layer having a first major surface contacting and permanently adhered to the second major surface of the color layer, the transparent protective layer having a second major surface opposite its first major surface, and the transparent protective layer comprising a thermoset second polymeric material, the transparent protective layer being substantially solvent-free.

In another aspect, the present disclosure provides a paint film composite comprising:
unpainted sheet metal;
a color layer contacting and permanently adhered to the unpainted sheet metal, the color layer having a first major surface contacting the unformed sheet metal, the color layer having a second major surface opposite the first major surface, and the color layer being opaque or translucent and comprising a colorant and a first polymeric material; and
a transparent protective layer having a first major surface contacting and permanently adhered to the second major surface of the color layer, the transparent protective layer having a second major surface opposite its first major surface, the transparent protective layer comprising a thermoset second polymeric material, and each of the first major surface of the transparent protective layer and the second major surface of the transparent protective layer being a substantial inverse image of a major surface of first and second respective corresponding forming webs.

In another aspect, the present disclosure provides a paint film composite comprising:
unpainted sheet metal;
an adhesive layer;
an opaque or translucent color layer permanently adhered to the unpainted sheet metal by the adhesive layer, the color layer having a first major surface contacting the adhesive layer, the color layer having a second major surface opposite its first major surface, and the color layer comprising a colorant and a first polymeric material; and
a transparent protective layer having a first major surface contacting and permanently adhered to the second major surface of the color layer, the transparent protective layer having a second major surface opposite its first major surface, the transparent protective layer comprising a thermoset second polymeric material, and the transparent protective layer being substantially solvent-free.

In another aspect, the present disclosure provides a paint film composite comprising:
unpainted sheet metal;
an adhesive layer;
an opaque or translucent color layer permanently adhered to the unpainted sheet metal by the adhesive layer, the color layer having a first major surface contacting the adhesive layer, the color layer having a second major surface opposite its first major surface, and the color layer comprising a colorant and a first polymeric material; and
a transparent protective layer having a first major surface contacting and permanently adhered to the second major surface of the color layer, the transparent protective layer having a second major surface opposite its first major surface, the transparent protective layer comprising a thermoset second polymeric material, and each of the first major surface of the transparent protective layer and the second major surface of the transparent protective layer being a substantial inverse image of a major surface of first and second respective corresponding forming webs.

In certain embodiments, the thermoset second polymeric material is selected from the group consisting of silicones, polyethers, acrylics, polyurethanes, and combinations thereof. In certain embodiments, the thermoset polymeric material comprises a polyurethane. In certain embodiments, the polyurethane is extensible and has hard segments in an amount of from 30 to 70 percent by weight.

In another aspect, the present disclosure provides a paint film composite comprising:
unpainted sheet metal;
an opaque or translucent color layer contacting and permanently adhered to the unpainted sheet metal, the color layer having a first major surface contacting the unpainted sheet metal, the color layer having a second major surface opposite its first major surface, and the color layer comprising a colorant and a first polymeric material; and
a transparent protective layer having a first major surface contacting and permanently adhered to the second major surface of the color layer, the transparent protective layer having a second major surface opposite its first major surface, the transparent protective layer comprising a second polymeric material, and the transparent protective layer being substantially isotropic and substantially solvent-free.

In another aspect, the present disclosure provides a paint film composite comprising:
unpainted sheet metal;
an adhesive layer;
an opaque or translucent color layer permanently adhered to the unpainted sheet metal by the adhesive layer, the color layer having a first major surface contacting the adhesive layer, the color layer having a second major surface opposite its first major surface, and the color layer comprising a colorant and a first polymeric material; and a transparent protective layer having a first major surface contacting and permanently adhered to the second major surface of the color layer, the transparent protective layer having a second major surface opposite its first major surface, the transparent protective layer comprising a second polymeric material, and the transparent protective layer being substantially isotropic and substantially solvent-free.

In certain embodiments, the second polymeric material is selected from the group consisting of silicones, polyethers, acrylics, polyurethanes, and combinations thereof. In certain embodiments, the second polymeric material comprises a polyurethane. In certain embodiments, the polyurethane is extensible and has hard segments in an amount of from 30 to 70 percent by weight.

In certain embodiments, the second major surface of the transparent protective layer exhibits surface shape recovery.

In certain embodiments, paint film composites according to the present disclosure further comprise a protective liner releasably adhered to and contacting the second major surface of the transparent protective layer.

Advantageously, paint film composites according to the present disclosure generally have one or more useful physical and aesthetic properties such as, but not limited to, little or no volatile organic solvent content (with essentially no solvent gradient with respect to film thickness), substantially identical mechanical properties with respect to length and width, very low visual defect rate, high gloss and good distinctness of image (for example, wet look), and the ability to form the paint film composites into shaped parts without compromising the paint film appearance.

In another aspect, the present disclosure provides a method of forming a shaped article, the method comprising forming any of the paint film composites according to the present disclosure into a predetermined shape.

In certain embodiments, the predetermined shape corresponds to a vehicle body part or at least a portion of an appliance housing. In certain embodiments, the predetermined shape corresponds to a vehicle body part.

In another aspect, the present disclosure provides a shaped article formed by any method of forming a shaped article according to the present disclosure.

In another aspect, the present disclosure provides a method of making a paint film composite, the method comprising:

contacting a curable composition with unpainted sheet metal and a major surface of a forming web to form a rolling bank of the curable composition being disposed at least partially between the unpainted sheet metal and the forming web, the curable composition comprising a colorant and a curable polymeric material precursor;

passing at least a portion of each of the unpainted sheet metal, the forming web, and the curable composition through a nip while said at least a portion of the curable composition is sandwiched between the unpainted sheet metal and the forming web to provide a curable layer precursor; and at least partially curing the curable layer precursor to provide an opaque or translucent color layer comprising the colorant and a polymeric material.

In another aspect, the present disclosure provides a method of making a paint film composite, the method comprising:

contacting a curable composition with a first forming web and a second forming web to form a rolling bank of the curable composition disposed at least partially between the first and second forming webs, the curable composition comprising a colorant and a curable polymeric material precursor;

passing at least a portion of each of the first and second forming webs and the curable composition through a nip while said at least a portion of the curable composition is sandwiched between the releasable first and second forming webs to provide a curable layer precursor;

at least partially curing the curable layer precursor to provide an opaque or translucent color layer comprising the colorant and a polymeric material;

separating the first forming web from the color layer; and permanently adhering the color layer to unpainted sheet metal with an adhesive.

In certain embodiments, the polymeric material is thermoset. In certain embodiments, the polymeric material is selected from the group consisting of silicones, polyethers, acrylics, polyurethanes, and combinations thereof. In certain embodiments, the polymeric material comprises a polyurethane. In certain embodiments, the polyurethane is extensible and has hard segments in an amount of from 30 to 70 percent by weight.

In another aspect, the present disclosure provides a method of making a paint film composite, the method comprising:

providing sheet metal having an opaque or translucent color layer disposed thereon, the color layer comprising a colorant and a first polymeric material;

contacting a curable composition with the color layer and a forming web to form a rolling bank of the curable composition at least partially disposed between the color layer and the forming web, the curable composition comprising a curable polymeric material precursor;

passing at least a portion of each of the sheet metal, the color layer, the forming web, and the curable composition through a nip while said at least a portion of the curable composition is sandwiched between the color layer and the forming web to provide a curable layer precursor; and at least partially curing the curable layer precursor to provide a transparent protective layer comprising a second polymeric material.

In another aspect, the present disclosure provides a method of making a paint film composite, the method comprising:

providing a first forming web having an opaque or translucent color layer disposed thereon, the color layer comprising a colorant and a first polymeric material;

contacting a curable composition with the color layer and a second forming web to form a rolling bank of the curable composition disposed between the color layer and the second forming web, the curable composition comprising a curable polymeric material precursor;

passing at least a portion of each of the first and second forming webs, the color layer, and the curable composition through a nip while said at least a portion of the curable composition is sandwiched between the color layer and the releasable protective liner to provide a curable layer precursor; and at least partially curing the curable layer precursor to provide a transparent protective layer comprising a second polymeric material;

separating the first forming web from the color layer; and permanently adhering the color layer to unpainted sheet metal with an adhesive.

In certain embodiments, at least one of the first polymeric material and the second polymeric material is thermoset. In certain embodiments, at least one of the first polymeric material and the second polymeric material is selected from the group consisting of silicones, polyethers, acrylics, polyurethanes, and combinations thereof. In certain embodiments, at least one of the first polymeric material and the second polymeric material comprises a polyurethane. In certain embodiments, the polyurethane is extensible and has hard segments in an amount of from 30 to 70 percent by weight.

In another aspect, the present disclosure provides a paint film composite made according to any method of making a paint film composite according to the present disclosure.

Advantageously, methods of making paint film composites according to the present disclosure have low coating defect rates, may be practiced using little or no volatile organic solvent (for example, resulting in paint film composites that are substantially or essentially solvent-free) and/or with essentially no solvent gradient with respect to film thickness, are suitable for preparing films of thicknesses not achievable in a single coating pass out of solvent, and are not prone to creating films with anisotropic mechanical properties. And, methods of making paint film composites according to the present disclosure are useful for making special effects (for example, metal flake, pearlescent) pigment-containing paint film composites.

The following definitions apply throughout the specification and claims.

"Adherend" refers to an object being adhered.

"Deformed sheet metal" as used herein refers to sheet metal stock that has been formed into a three-dimensional shape.

"Substantially isotropic" means having at least one mechanical property that does not vary, or only slightly varies, along the length direction and width direction, and also means not having an organic solvent gradient across the thickness direction. Thus, an extruded polymeric layer is not considered substantially isotropic, when the polymeric layer has at least one mechanical property that is different when measured along its length compared to the same mechanical property measured along its width. In addition, a solvent-cast polymeric layer is not considered substantially isotropic, when the polymeric layer has an organic solvent concentration gradient across its thickness. Such a concentration gradient generally indicates that the polymeric layer was solvent cast.

"Essentially isotropic" means having the same mechanical properties with respect to length and width, and not having an organic solvent gradient with respect to thickness.

"Substantially solvent-free" means containing less than or equal to 0.5 percent by weight of volatile organic solvent.

"Essentially solvent-free" means containing less than or equal to 0.3 percent by weight of volatile organic solvent.

"Forming web" refers to a film, layer, belt or other web-shaped substrate having a major surface on which a corresponding major surface of the color layer or the protective transparent layer is removably or permanently formed.

"Layer" refers to a unitary layer unless otherwise specified.

"One-part urethane" and "two-part urethane" refer to curable resins that react to form a polyurethane.

"Permanently adhered" in reference to two adherends means not mechanically separable without causing significant physical damage to (for example, tears or rips in) the adhesive layer or either of the two adherends.

"Polyurethane" refers to polymers having repeated subunits in the backbone that have —OC(=O)NH— and/or —HNC(=O)NH— groups.

"Volatile organic solvent" refers to any organic solvent having an initial boiling point less than or equal to 250° C. at a pressure of 1 atmosphere (101.3 kPa).

Other objects and advantages of the invention will become more apparent from the following drawings wherein like numerals refer to like parts, the accompanying description and the appended claims.

Figure 1:
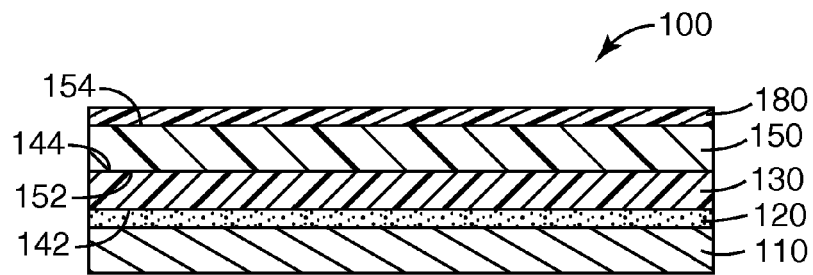
FIG. 1 is a side-view of an exemplary paint film composite according to the present disclosure.

While the invention is amenable to various modifications and alternative forms, specifics thereof that have been shown by way of example in the drawings will be described in detail. It should be understood, however, that the intention is not to limit the invention to the particular embodiments described. To the contrary, the intention is to cover all modifications, equivalents, and alternatives falling within the spirit and scope of the present disclosure.

DETAILED DESCRIPTION

To promote an understanding of the principles of the present invention, descriptions of specific embodiments of the present invention follow and specific language is used to describe the specific embodiments. It will nevertheless be understood that no limitation of the scope of the present invention is intended by the use of specific language. Alterations, further modifications, and such further applications of the principles of the present invention discussed are contemplated as would normally occur to one ordinarily skilled in the art to which the invention pertains.

An exemplary embodiment of a paint film composite is broadly shown in FIG. 1. Referring now to FIG. 1, paint film composite 100 comprises unpainted sheet metal 110, optional adhesive layer 120, and color layer 130. Color layer 130 is opaque or translucent and has first major surface 142 and second major surface 144 opposite first major surface 142. In various embodiments, color layer 130 may contact and be permanently adhered to unpainted sheet metal 110, or it may be permanently adhered to unpainted sheet metal 110 by optional adhesive layer 120.

If present, optional transparent protective layer 150 has first major surface 152 and second major surface 154. First major surface 152 of the optional transparent protective layer 150 contacts and is permanently adhered to second major surface 144 of color layer 130.

If present, optional protective liner 180 is releasably adhered to second major surface 144 of color layer 130 or, if optional transparent protective layer 150 is present, second major surface 154 of transparent protective layer 150.

Unpainted Sheet Metal 110

The unpainted sheet metal may be in the form of sheet metal stock or it may be deformed (that is, unpainted deformed sheet metal) such as, for example, into the shape of an automotive body part or some other shape. The unpainted sheet metal may comprise any metal or alloy thereof. Exemplary metals include steel (for example, cold rolled steel, high carbon steel, and stainless steel), aluminum, titanium, nickel, copper, zinc, and iron.

As used herein, the phrase "sheet metal stock" refers to a length of sheet metal in coil form or flat sheet form having a thickness between that of foil and plate, generally having a thickness in a range of from 0.0060 inch (0.15 millimeter, m)

to 0.250 inch (6.35 mm), and that has not been deformed into a three-dimensional shape. The unpainted sheet metal may have any dimension with respect to length and width.

As used herein, the phrase "unpainted" refers to the absence of a final top layer of finished paint. Thus, unpainted sheet metal refers to a length of sheet metal having a bare surface, free of any permanent finish coatings, or a surface that has been primed or otherwise coated with an undercoating (for example, a primer and/or a corrosion resistant coating) or surface treatment (for example, anodization). Exemplary undercoatings and surface treatments include e-coats, galvanized coatings, anodizing, phosphate coatings, and chromate coatings.

The unpainted sheet metal may have additional layers or components (for example, on the side opposite the color layer).

Optional Adhesive Layer 120

The optional adhesive layer may comprise any adhesive that is capable of permanently adhering the color layer to the unpainted sheet metal. For example, the adhesive layer may comprise a pressure-sensitive adhesive, a hot melt adhesive, or a combination thereof. Examples of pressure-sensitive adhesives include tackified or untackified materials such as tackified natural rubbers, tackified synthetic rubbers, tackified styrene block copolymers, self-tacky or tackified acrylate or methacrylate copolymers, self-tacky or tackified poly(alpha-olefins), and self-tacky or tackified silicones. Examples of hot melt adhesives include hot melt adhesives based on polyester, ethylene vinyl acetate (EVA), polyamides, polyurethanes, and polyethers. The optional adhesive layer may have any thickness, but will typically have a thickness in a range of from 1 to 100 micrometers.

The optional adhesive layer may be supplied by any suitable technique. For example, the optional adhesive layer can be applied to the unpainted sheet metal prior to applying the color layer, or it may be applied to the color layer and then bonded to the unpainted sheet metal. Suitable application methods for the optional adhesive layer include, for example, spraying, solvent coating, and lamination.

Color Layer 130

Color layer 130 comprises a colorant and a polymeric material. Examples of colorants include any colorants known in the automotive or graphic arts (for example, high performance or automotive grade pigments (whether colored, white, or black), pearlescent pigments, titanium dioxide, carbon black, metal flakes, dyes, and combinations thereof). Typically, the colorant is selected to have acceptable lightfastness and weathering characteristics for the intended use of the paint film composite as well as compatibility with the other components of color layer 130. Combinations of more than one colorant may be used. Sufficient colorant should be used that color layer 130 in the paint film composite is opaque or translucent; however, excessive amounts of colorant may tend to degrade physical properties of color layer 130. Typically, the amount of colorant will be less than about 20, 15, 10, 7, or 5 percent of the total weight of color layer 130, but this is not a requirement.

Metal flake containing paints known as "metallic" paints are a highly specialized class of paint. They are widely used to provide glitz and glamour to automobile manufacturers' products. The special appearance of metallic paints results from the random orientation of the metal flakes within the paint coating. This random orientation results directly from the presence and evaporation of the solvent from the paint. Convection currents within the paint are established as the solvent evaporates from the surface of the paint which causes the paint surface to cool which then causes the surface paint to thermally sink within the paint where it can capture heat from the paint and rise back to the surface where more solvent evaporates, repeating the process. This circulates the metal flakes within the coating causing their orientation to randomize, thereby achieving the desired appearance. Extrusion processes orient pigments such as metal flake and are generally not able to achieve an excellent appearance. Advantageously, in some embodiments, methods according to the present disclosure are useful for preparing "metallic" paint film composites that achieve an appearance comparable to that obtained by solvent coating techniques.

Examples of polymeric materials include melt-processable polymeric materials such as thermoplastic or lightly crosslinked polymeric materials, and thermoset polymeric materials. As used herein, the term "thermoset" means chemically crosslinked to the point where melt flow cannot occur.

Examples of suitable polymeric materials include silicones (for example, as made by moisture curing silicone resin, optionally in the presence of an appropriate catalyst), polyethers (for example, from polymerization of a one-part or two-part epoxy resin, optionally in the presence of an appropriate catalyst), acrylics (for example, as made by thermal or photo-polymerization of acrylic monomer(s)), polyurethanes (for example, as made by condensation polymerization of one-part or two-part urethane resins, optionally in the presence of an appropriate catalyst), and combinations thereof.

Typically, the polymeric materials are prepared from components (for example, monomers, oligomers, hardeners, initiators) that do not off-gas at or near ambient conditions. Accordingly, it is typically desirable to place the components comprising color layer 130 under vacuum to remove volatile components prior to forming color layer 130. In general, to achieve useful film properties the functionality of addition polymerizable monomers and oligomers (for example, epoxies, acrylates, vinyl ethers) should be at least one (1), more typically at least 1.1, 1.2, 1.3, 1.4, 1.5, or even at least 1.8 or 2.0, or more. In general, to achieve useful film properties the functionality of condensation polymerizable monomers and oligomers (for example, alkoxysilanes, two-part urethanes) should be at least two (2) for each reactive component (for example, a polyisocyanate/polyol pair), more typically at least 2.1, 2.2, 2.3, 2.4, 2.5, or even at least 2.8 or 3.0, or more. In general, lower functionality is associated with relatively increased extensibility (for example, elongation at break) and relatively lower hardness, while the converse is generally true with higher functionality.

Combinations of the foregoing curable monomers and oligomers may also be used (for example, silicone/acrylate or urethane/acrylate). The specific choice of materials will typically depend on the desired physical properties (for example, strength, appearance, weatherability, formability, abrasion resistance) of color layer 130.

Silicones and curable systems for their preparation are well-known. Silicones may be obtained, for example, by curing of moisture-cure silicones (for example, RTV silicones), two-part silicones (for example, a Part A of hydroxy-terminated polydimethylpolysiloxane and a Part B of trialkoxysilyl-terminated polydimethylsiloxane), or photo- or thermal curing of vinyl substituted polydimethylsiloxanes and hydride-terminated polydimethylsiloxanes using a hydrosilation catalyst. In addition, silicones may be prepared from monomeric silanes such as, for example, dimethoxydimethylsilane, dimethoxydiethylsilane, diethoxydimethylsilane, diethoxydiethylsilane, and other dialkoxydialkylsilanes; trimethoxymethylsilane, trimethoxyethylsilane, trimethoxypropylsilane, triethoxymethylsilane, triethoxyethylsilane, and other trialkoxyalkylsilanes; tetramethoxysilane, tetraethoxysilane, tetrapropoxysilane, and other tetraalkoxysilanes; methyltri(methoxyethoxy)silane, and other alkoxyalkoxysilanes; methyltriisopropenoxy-silane, and other alkenoxysilanes; methyltriacetoxysilane, and other acyloxysilanes. Optionally, an acid catalyst may be included such as, for example, acetic acid, propionic acid, and fatty acids.

Polyethers and curable systems for their preparation are well-known. Examples of polyethers include polymers containing ethylenoxy, propylenoxy, and/or butylenoxy monomeric units. Polyethers may be uncrosslinked, but more typically are cross-linked (thermoset) produced by curing of epoxy monomer(s) and resin(s).

Examples of useful epoxy monomers include trimethylolpropane triglycidyl ether, 1,4-butanediol diglycidyl ether, ethylene glycol diglycidyl ether, cyclohexanedimethanol diglycidyl ether, polypropylene glycol diglycidyl ether, polyglycol diglycidyl ether, 1,6-hexanediol diglycidyl ether, trimethylolethane triglycidyl ether, castor oil triglycidyl ether, propoxylated glycerin triglycidyl ether, glycerol polyglycidyl ether; diglycerol polyglycidyl ether; glycerol propoxylate triglycidyl ether; trimethylolpropane triglycidyl ether; sorbitol polyglycidyl ether; poly(ethylene glycol) diglycidyl ether; polypropylene glycol) diglycidyl ether; neopentyl glycol diglycidyl ether; N,N-diglycidyl-4-glycidyloxyaniline; N,N-diglycidyltoluidine; diglycidyl 1,2-cyclohexanedicarboxylate; diglycidyl bisphenol A; a polymer of diglycidyl bisphenol A; poly(bisphenol A-co-epichlorohydrin), glycidyl end capped; diglycidyl ether of a hydrogenated bisphenol A propylene oxide adduct; diglycidyl ester of terephthalic acid; diglycidyl 1,2,3,6-tetrahydrophthalate; spiroglycol diglycidyl ether; hydroquinone diglycidyl ether and derivatives thereof, propylene oxide, epichlorohydrin, styrene oxide, vinylcyclohexene oxide, vinylcyclohexene dioxide, glycidol, butadiene oxide, diglycidyl ether of bisphenol A, cyclohexene oxide, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)adipate, dicyclopentadiene dioxide, epoxidized polybutadiene, 1,4-butanediol diglycidyl ether, polyglycidyl ether of phenolformaldehyde resole or novolac resin, resorcinol diglycidyl ether, and epoxy silicones, for example, dimethylsiloxanes having cycloaliphatic epoxide or glycidyl ether groups, and mixtures thereof. Epoxy resins and monomers can be polymerized, for example, using a photocatalyst or a Lewis acid (for example, $BF_3$).

Two part-epoxy resins (for example, having a Part A of an amine or thiol hardener and a Part B having an epoxy group functional resin) are widely available and may also be used.

Acrylic polymers may be prepared by free-radical polymerization of free-radically polymerizable monomers such as, for example, (meth)acrylates (that is, acrylates and/or methacrylates) and vinyl ester functionalized materials. Of particular use are (meth)acrylates. They can be monomers and/or oligomers such as (meth)acrylates (meth)acrylamides, vinyl pyrrolidinone and azlactones. Such monomers include mono-, di-, or polyacrylates and methacrylates such as methyl acrylate, methyl methacrylate, ethyl acrylate, isopropyl methacrylate, isooctyl acrylate, acrylic acid, n-hexyl acrylate, stearyl acrylate, allyl acrylate, glycerol diacrylate, glycerol triacrylate, ethylene glycol diacrylate, diethyleneglycol diacrylate, triethyleneglycol dimethacrylate, 1,3-propanediol diacrylate, 1,3-propanediol dimethacrylate, trimethanol triacrylate, 1,2,4-butanetriol trimethylacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyl dimethylmethane, bis[1-(3-acryloxy-2-hydroxy)]-p-propoxyphenyl-dimethylmethane, tris-hydroxyethyl isocyanurate trimethacrylate; the bis-methacrylates of polyethylene glycols of molecular weight 200-500 g/mole, copolymerizable mixtures of acrylated monomers such as those described in U.S. Pat. No. 4,652,274 (Boettcher et al.), and acrylated oligomers such as those described in U.S. Pat. No. 4,642,126 (Zador et al.), the disclosures of which are incorporated herein by reference. Typically, a thermal initiator (for example, a peroxide or an azo initiator such as azobis(isobutyronitrile)) or a photoinitiator (for example, as available from Ciba Specialty Chemicals, Tarrytown, N.Y., under the trade designations DAROCUR and IRGACURE).

Methods and catalysts for curing the foregoing monomers may be found in U.S. Pat. No. 5,252,694 (Willett et al.), the disclosure of which is incorporated herein by reference.

In certain embodiments, the polymeric material comprises a polyurethane.

Polyurethanes may be prepared, for example, by the reaction of one or more polyols and/or polyamines and/or aminoalcohols with one or more polyisocyanates, optionally in the presence of non-reactive component(s). For applications where weathering is likely, it is typically desirable for the polyols, polyamines, and/or aminoalcohols and the polyisocyanates to be free of aromatic groups.

Suitable polyols include, for example, materials commercially available under the trade designation DESMOPHEN from Bayer Corporation, Pittsburgh, Pa. The polyols can be polyester polyols (for example, Desmophen 631A, 650A, 651A, 670A, 680, 110, and 1150); polyether polyols (for example, Desmophen 550U, 1600U, 1900U, and 1950U); or acrylic polyols (for example, Desmophen A160SN, A575, and A450BA/A).

Suitable polyamines include, for example: aliphatic polyamines such as, for example, ethylene diamine, 1,2-diaminopropane, 2,5-diamino-2,5-dimethylhexane, 1,11-diaminoundecane, 1,12-diaminododecane, 2,4- and/or 2,6-hexahydrotoluoylenediamine, and 2,4'-diamino-dicyclohexylmethane; and aromatic polyamines such as, for example, 2,4- and/or 2,6-diaminotoluene and 2,4'- and/or 4,4'-diaminodiphenylmethane; amine-terminated polymers such as, for example, those available from Huntsman Chemical (Salt Lake City, Utah), under the trade designation JEFFAMINE polypropylene glycol diamines (for example, Jeffamine XTJ-510) and those available from Noveon Corp., Cleveland, Ohio, under the trade designation Hycar ATBN (amine-terminated acrylonitrile butadiene copolymers), and those disclosed in U.S. Pat. No. 3,436,359 (Hubin et al.) and U.S. Pat. No. 4,833,213 (Leir et al.) (amine-terminated polyethers, and polytetrahydrofuran diamines); and combinations thereof.

Suitable aminoalcohols include, for example, 2-aminoethanol, 3-aminopropan-1-ol, alkyl-substituted versions of the foregoing, and combinations thereof.

Suitable polyisocyanate compounds include, for example: aromatic diisocyanates (for example, 2,6-toluene diisocyanate; 2,5-toluene diisocyanate; 2,4-toluene diisocyanate; m-phenylene diisocyanate; p-phenylene diisocyanate; methylene bis(o-chlorophenyl diisocyanate); methylenediphenylene-4,4'-diisocyanate; polycarbodiimide-modified methylenediphenylene diisocyanate; (4,4'-diisocyanato-3,3',5,5'-tetraethyl)diphenylmethane; 4,4'-diisocyanato-3,3'-dimethoxybiphenyl(o-dianisidine diisocyanate); 5-chloro-2,4-toluene diisocyanate; and 1-chloromethyl-2,4-diisocyanatobenzene), aromatic-aliphatic diisocyanates (for example, m-xylylene diisocyanate and tetramethyl-m-xylylene diisocyanate); aliphatic diisocyanates (for example, 1,4-diisocyanatobutane; 1,6-diisocyanatohexane; 1,12-diisocyanatododecane; and 2-methyl-1,5-diisocyanatopentane); cycloaliphatic diisocyanates (for example, methylenedicyclohexylene-4,4'-diisocyanate; 3-isocyanatomethyl-3,5,5-trimethylcyclohexyl isocyanate (isophorone diisocyanate); 2,2,4-trimethylhexyl diisocyanate; and cyclohexylene-1,4-diisocyanate), polymeric or oligomeric compounds (for example, polyoxyalkylene, polyester, polybutadienyl, and the like) terminated by two isocyanate functional groups (for example, the diurethane of toluene-2,4-diisocyanate-terminated polypropylene oxide glycol); polyisocyanates commercially available under the trade designation MONDUR or DESMODUR (for example, Desmodur XP7100 and Desmodur N 3300) from Bayer Corporation, Pittsburgh, Pa.; and combinations thereof.

The polyurethane(s) may comprise a reaction product of components comprising at least one polyisocyanate and at least one polyol. In certain embodiments, the at least one polyisocyanate comprises an aliphatic polyisocyanate. In certain embodiments, the at least one polyol comprises an aliphatic polyol. In certain embodiments, the at least one polyol comprises a polyester polyol or a polycarbonate polyol.

Typically, the polyurethane(s) is/are extensible and/or pliable. For example, the polyurethane(s), or any layer containing polyurethane, may have a percent elongation at break (at ambient conditions) of at least 10, 20, 40, 60, 80, 100, 125, 150, 175, 200, 225, 250, 275, 300, 350, or even at least 400 percent, or more.

In certain embodiments, the polyurethane has hard segments, typically segments corresponding to one or more polyisocyanates, in any combination, in an amount of from 30, 35, 40, or 45 percent by weight up to, 50, 55, 60, 65, or even 70 percent by weight.

As used herein: wt % means percent by weight based on the total weight of material, and Hard Segment wt %=(weight of short chain diol and polyol+weight of short chain di- or polyisocyanate)/total weight of resin
wherein:
short chain diols and polyols have an equivalent weight ≤185 g/eq, and a functionality ≥2; and
short chain isocyanates have an equivalent weight ≤320 g/eq and a functionality ≥2.

One or more catalysts are typically included with two-part urethanes. Catalysts for two-part urethanes are well known and include, for example, aluminum-, bismuth-, tin-, vanadium-, zinc-, tin-, and zirconium-based catalysts. Tin-based catalysts have been found to significantly reduce the amount of outgassing during formation of the polyurethane. Examples of tin-based catalysts include dibutyltin compounds such as dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide. If present, any catalyst is typically included at levels of at least 200 parts per million by weight (ppm), 300 ppm, or more, however this is not a requirement.

Additional suitable two-part urethanes are described in U.S. Pat. No. 6,258,918 B1 (Ho et al.) and U.S. Pat. No. 5,798,409 (Ho), the disclosures of which are incorporated herein by reference.

In general, the amounts of polyisocyanate to polyol, polyamine, and/or aminoalcohol in a two-part urethane are selected in approximately stoichiometrically equivalent amounts, although in some cases it may be desirable to adjust the relative amounts to other ratios. For example, a slight stoichiometric excess of the polyisocyanate may be useful to ensure a high degree of incorporation of the polyol, polyamine, and/or aminoalcohol, although any excess isocyanate groups present after polymerization will typically react with materials having reactive hydrogens (for example, adventitious moisture, alcohols, amines, etc.).

Color layer 130 may further comprise one or more optional additives such as, for example, flame retardants, fillers, antioxidants, UV light absorbers, hindered amine light stabilizers (HALS), plasticizers, and rheology modifiers.

In some embodiments, color layer 130 may contain one or more volatile organic solvents, typically in amounts of less than about 5 percent, more typically less than 1 percent, more typically less than 0.5 percent, and even more typically in an amount of less than 0.3 or even 0.1 percent, or color layer 130 may even be essentially solvent-free.

Color layer 130 may have any thickness and may be coextensive in boundaries with the unpainted sheet metal, or it may be disposed on only a portion or separate portions of a major surface of the unpainted sheet metal. Typically, the thickness of color layer 130 has a thickness of from about 0.3 mil (8 micrometers) to about 20 mils (0.51 millimeters), and more typically from about 3 mil (80 micrometers) to about 7 mils (0.2 millimeters).

Advantageously, color layer 130 may be substantially or even essentially isotropic, and/or substantially or even essentially solvent-free, for example, if made according to at least some embodiments of methods according to the present disclosure. This is a typical result of polymerizing a color layer precursor between two forming webs under conditions wherein no orientation of the resultant color layer 130 occurs, and even in the event that a volatile organic solvent is present, no volatile organic solvent gradient is formed due to evaporation as occurs during solvent casting.

Alternatively, or in addition, each of the first and second major surfaces of color layer 130 may be a substantial inverse image of a major surface of a corresponding forming web, for example, if made according to at least some embodiments of methods according to the present disclosure. This feature may directly result from forming color layer 130 between two forming webs such that polymerization of a color layer precursor occurs to form color layer 130 while it is in intimate contact with major surfaces of two corresponding forming webs, thereby imparting a predetermined surface topography to the first and second major surfaces (142, 144) of color layer 130, the predetermined topography of each being a substantial inverse image of the major surface of a corresponding web forming substrate. In some embodiments, the forming webs may comprise releasable liners (release liners). In some embodiments, the unpainted sheet metal comprises one of the forming webs. In some embodiments, the unpainted sheet metal and optional adhesive layer comprise one of the forming webs.

Figure 5:
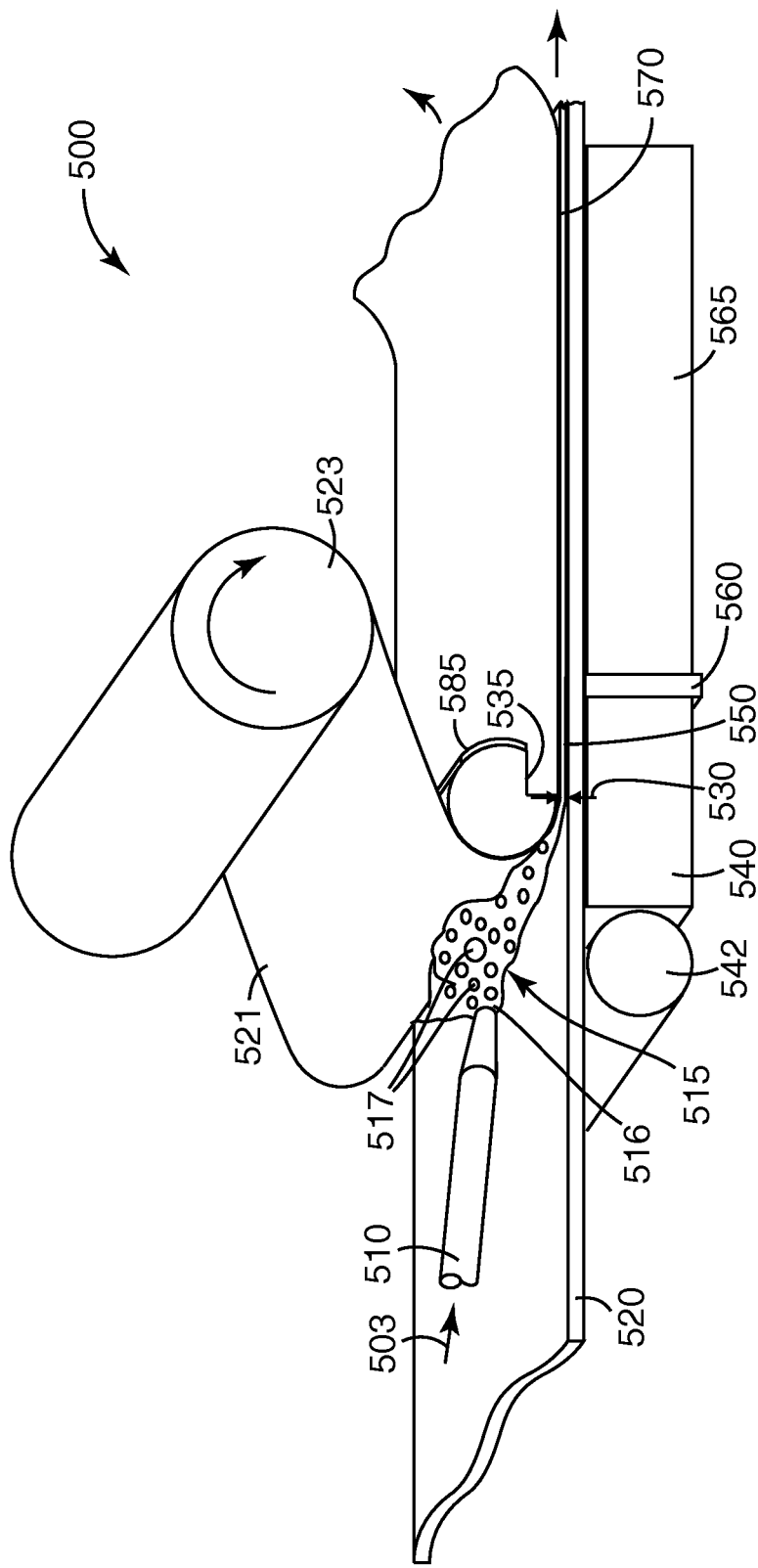
FIG. 5 is a perspective schematic side-view showing an exemplary method of forming a paint film composite according to the present disclosure.

In certain embodiments, for example, if made according to methods of the present disclosure generally shown in FIG. 5, color layer 130 may be essentially free of visible surface defects, that is, free of surface defects that are noticeable to an unaided human eye, with normal 20/20 vision, at a distance of 0.3 meter.

Color layer 130 may have any desired appearance, for example, ranging from matte to glossy. If color layer 130 forms an exterior surface of the paint film composite it may be desirable that the second major surface of color layer 130 has a 60 degree gloss according to ASTM Test Method D2457-03 "Standard Test Method for Specular Gloss of Plastic Films and Solid Plastics" of at least about 60 gloss units, and typically at least about 80 gloss units, in substantially all areas of the second major surface of color layer 130, including those that have been permanently deformed (that is, strained). Similarly, if color layer 130 forms an exterior surface of the paint film composite it may be desirable that the second major surface of color layer 130 has a distinctness of image according to ASTM Test Method D5767-95 "Standard Test Methods for Instrumental Measurement of Distinctness-of-Image Gloss of Coating Surfaces" of at least about 60, and typically at least about 80, in substantially all areas of the second major surface of color layer 130, including those that have been permanently deformed.

In some embodiments, the second major surface of color layer 130 exhibits surface shape recovery. As used herein, the term "surface shape recovery" refers to the ability of a surface of a material (for example, a color layer or a transparent protective layer) to rapidly recover from indentations made therein to its prior non-indented visual appearance, either spontaneously or upon heating. Without wishing to be bound by theory, it is believed that surface shape recovery results at least in part from the existence of a three-dimensional crosslink network (either chemical or physical) formed by polymeric material (for example, in color layer 130 or transparent protective layer 250), where the crosslinks are separated by flexible segments with sufficient molecular weight that the segments at least collapse into random coils as initially formed but extend linearly if deformed (for example, indented). Upon standing or heating the segments the material returns to its original dimensions; in the case of a surface of a layer of such a polymeric material the surface will recover its original appearance.

Examples of segments capable of this behavior include segments in polyurethanes that are derived from polyester diols or polyether diols having molecular weight on the order of at least about 1500, 2000, 2500, or even at least about 3000 grams per mole, or more.

Optional Transparent Protective Layer 150

Optionally, a transparent protective layer 150 may be present in combination with color layer 130. The transparent protective layer may comprise any material capable of forming a transparent film. Examples include any materials known for use as clear coats or clear coat films in the automotive industry. Clear coats can be applied, for example, by casting out of solvent. Clear coat films (typically having a pressure sensitive adhesive layer on a major surface thereof) may be laminated using conventional techniques.

Additional examples of materials suitable for use in forming the transparent protective layer 150 include transparent polyurethanes described in U.S. Pat. No. 6,258,918 B1 (Ho et al.) and U.S. Pat. No. 5,798,409 (Ho).

The optional transparent protective layer 150 may have any thickness and may be coextensive in boundaries with color layer 130, or it may be disposed on only a portion or separate portions of the second major surface of color layer 130. Typically, the thickness of the transparent protective layer 150 has a thickness of from about 0.4 mil (10 micrometers) to about 30 mils (0.76 millimeters), and more typically from about 6 mils (200 micrometers) to about 14 mils (0.36 millimeters).

Optional Protective Liner 180

An optional protective liner 180 may be present in contact with, and releasably adhered to, the outermost of the second major surface of color layer 130 or the second major surface of the optional transparent layer (if present). Suitable protective liners include, for example, polymer sheets, films, or papers, optionally coated with an adhesive or a low surface energy coating. Suitable low surface energy coatings may include, for example, those formed from polyacrylics, silicones, and/or fluorochemicals.

Figure 2:
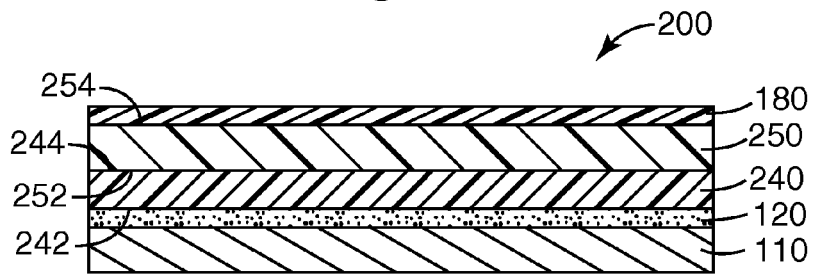
FIG. 2 is a side-view of an exemplary paint film composite according to the present disclosure.

Additional exemplary embodiments of paint film composites are broadly shown in FIG. 2. Referring now to FIG. 2, paint film composite 200 comprises unpainted sheet metal 110, optional adhesive layer 120, and color layer 240. Color layer 240 is opaque or translucent and has first major surface 242 and second major surface 244 opposite first major surface 242. In various embodiments, color layer 240 may contact and be permanently adhered to unpainted sheet metal 110, or it may be permanently adhered to unpainted sheet metal 110 by optional adhesive layer 120. Transparent protective layer 250 has first major surface 252 and second major surface 254. First major surface 252 of transparent protective layer 250 contacts and is permanently adhered to second major surface 244 of color layer 240. If present, optional protective liner 180 is releasably adhered to second major surface 254 of transparent protective layer 250.

In these embodiments, unpainted sheet metal 110, optional adhesive layer 120, and optional protective liner 180 are as described above.

Color Layer 240

Color layer 240 comprises a colorant and a polymeric material. In some embodiments, color layer 240 is the same as color layer 130, while in other embodiments it is different. Colorants useful in color layer 240 include those suitable for use in color layer 130.

Examples of polymeric materials useful in color layer 240 include all those suitable for use in color layer 130, but may also include in addition, or in place of, other polymeric materials not suitable for achieving the desired characteristics of color layer 130. For example, color layer 240 may be formed from extruded thermoplastic materials comprising, for example, one or more thermoplastic polyolefins, thermoplastic polyurethanes, thermoplastic acrylics, thermoplastic fluoropolymers, thermoplastic polyamides, thermoplastic polyesters, thermoplastic polycarbonates, or a combination thereof. Also, color layer 240 may be formed by solvent casting methods, for example, using gravure coating. In such cases, color layer 240 typically comprises one or more colorants dispersed in a polymeric binder, which may be thermoplastic or thermoset. Examples of polymeric binders include acrylics, urethanes, silicones, polyethers, phenolics, aminoplasts, and combinations thereof. Color layer 240 may also be formed by printing an ink.

Color layer 240 may further comprise one or more optional additives such as, for example, flame retardants, fillers, antioxidants, UV light absorbers, hindered amine light stabilizers (HALS), plasticizers, and rheology modifiers.

In some embodiments, color layer 240 may contain one or more volatile organic solvents, typically in amounts of less than about 5 percent, more typically less than 1 percent, more typically less than 0.5 percent, and even more typically in an amount of less than 0.3 or even 0.1 percent, or color layer 240 may even be essentially solvent-free.

Color layer 240 may have any thickness and may be coextensive in boundaries with the unpainted sheet metal, or it may be disposed on only a portion or separate portions of a major surface of the unpainted sheet metal. Typically, the thickness of color layer 240 has a thickness of from about 0.3 mil (8 micrometers) to about 20 mils (0.51 millimeters), and more typically from about 3 mil (80 micrometers) to about 7 mils (0.2 millimeters).

Transparent Protective Layer 250

Transparent protective layer 250 is first of all transparent, although it may be colored, or more typically essentially colorless.

Examples of polymeric materials useful in transparent protective layer 250 include all those suitable for use in color layer 130, except that little or no colorant would be incorporated.

Transparent protective layer 250 may have any thickness and may be coextensive in boundaries with color layer 240, or it may be disposed on only a portion or separate portions of the second major surface of color layer 240. Typically, the thickness of the transparent protective layer 250 has a thickness of from about 0.4 mil (10 micrometers) to about 30 mils (0.76 millimeters), and more typically from about 6 mil (200 micrometers) to about 14 mils (0.36 millimeters).

Advantageously, transparent protective layer 250 may be substantially or even essentially isotropic, and/or substantially or even essentially solvent-free, for example, if made according to at least some embodiments of methods according to the present disclosure. This is a typical result of polymerizing a transparent protective layer precursor between two forming webs under conditions wherein substantially no orientation of the resultant transparent protective layer 250 occurs, and even in the event that a volatile organic solvent is present, no volatile organic solvent gradient is formed due to evaporation as occurs during solvent casting.

Alternatively, or in addition, each of the first and second major surfaces of transparent protective layer 250 may be a substantial inverse image of a major surface of a corresponding forming web, for example, if made according to at least some embodiments of methods according to the present disclosure. This feature may directly result from forming transparent protective layer 250 between two forming webs such that polymerization of a transparent protective layer precursor occurs to form transparent protective layer 250 while it is in intimate contact with major surfaces of two corresponding forming webs, thereby imparting a predetermined surface topography to the first and second major surfaces (252, 254) of transparent protective layer 250, the predetermined topography of each being a substantial inverse image of the major surface of a corresponding web forming substrate. In some embodiments, the forming webs may comprise releasable liners (release liners). In some embodiments, the unpainted sheet metal comprises one of the forming webs. In some embodiments, the unpainted sheet metal and optional adhesive layer comprise one of the forming webs.

In certain embodiments, for example, if made according to methods of the present disclosure generally shown in FIG. 5, transparent protective layer 250 may be essentially free of visible surface defects.

Transparent protective layer 250 may have any desired appearance, for example, ranging from matte to glossy. If transparent protective layer 250 forms an exterior surface of the paint film composite it may be desirable that the second major surface of color layer 130 has a 60 degree gloss according to ASTM Test Method D2457-03 "Standard Test Method for Specular Gloss of Plastic Films and Solid Plastics" of at least about 60 gloss units, and typically at least about 80 gloss units, in substantially all areas of the second major surface of color layer 130, including those that have been permanently deformed (that is, strained). Similarly, if transparent protective layer 250 forms an exterior surface of the paint film composite it may be desirable that the second major surface of transparent protective layer 250 has a distinctness of image according to ASTM Test Method D5767-95 "Standard Test Methods for Instrumental Measurement of Distinctness-of-Image Gloss of Coating Surfaces" of at least about 60, and typically at least about 80, in substantially all areas of the second major surface of transparent protective layer 250, including those that have been permanently deformed.

Since it may have essentially the same composition (other than color level) as color layer 130, in some embodiments, the second major surface of transparent protective layer 250 likewise exhibits surface shape recovery.

Method of Making Shaped Articles

Figure 3:
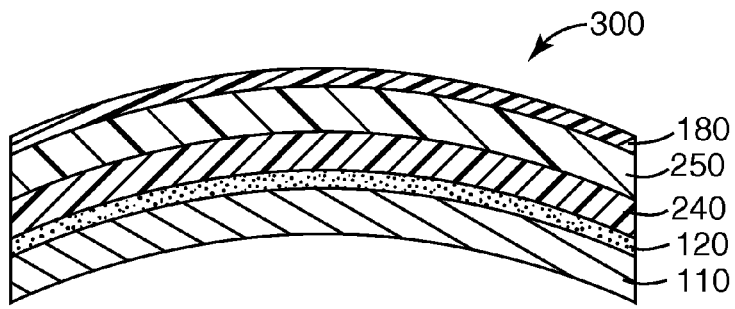
FIG. 3 is a side-view of a deformed exemplary paint film composite according to the present disclosure.

FIG. 3 depicts a shaped article 300 formed by permanently deforming paint film composite 200. While a simple bend is shown, it will be recognized that complex three-dimensional shapes may also be formed.

Paint film composites according to the present disclosure may be, for example, two dimensional sheets or coils, or they may be permanently deformed into 3-dimensional simple or complex shapes. Methods of permanently deforming the paint film composites include, for example, any method known for deforming sheet metal such as, for example, simple bending, roll forming, and stamping. Advantageously, and surprisingly, paint film composites according to the present disclosure can be formulated such that they can endure the stresses of such deformation and maintain a functional color layer and, if present, transparent protective layer, and provide an aesthetically desirable appearance having a high quality appearance, comparable or better in appearance to a corresponding painted surface, and that is suitable for use "as is" in various applications such as, for example, vehicle body parts. Further, in some embodiments, the resultant article exhibits surface shape recovery, which facilitates maintenance of the surface appearance during normal use.

For example, paint film composites according to the present disclosure may be capable of being permanently deformed by bending at an angle of at least 20, 30, 45, 60, 70, or even 90 degrees around a mandrel resulting in a radius of curvature of the bend angle of 1, 2, 3, 5, or 10 centimeters, or more, without cracking or splitting and while retaining at least 50, 60, 70, 80, or even 90 percent or more of gloss and distinctness of image prior to deformation.

The number of shaped articles formable from paint film composites according to the present disclosure is virtually unlimited. Examples of shaped articles that can be formed by permanently deforming embodiments of paint film composites according to the present disclosure include vehicle trim, architectural trim, appliance (for example, a refrigerator, stove, washer, or dryer) housings or a portion thereof, and vehicle body parts.

Figure 4:
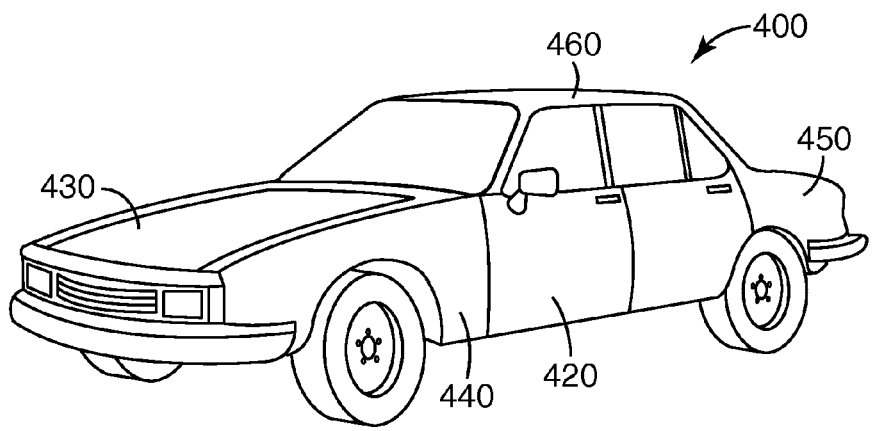
FIG. 4 is a perspective view of an automobile showing exemplary paint film composites according to the present disclosure shaped into vehicle body parts.

Representative automobile body parts are shown in FIG. 4 on automobile 400, specifically roof 460, hood 430, quarter panels 440 and 450, and door 420. These and other vehicle body parts may be operatively adapted (that is, dimensioned and designed) for forming part of a land vehicle, aircraft, or watercraft. For example, the vehicle body part may be a body part of at least one vehicle selected from the group consisting of automobiles, trucks, bicycles, boats, snowmobiles, all-terrain vehicles, motorcycles, airplanes, helicopters, hovercraft, buses, trolleys, and railroad cars.

Methods of Making

FIG. 5 illustrates an exemplary process 500 for forming paint film composites according to the present invention and/or component layers thereof. Referring now to FIG. 5, reactive component(s) 503 is/are fed into dynamic mixer 510. The mixed components combine to form reactive composition 516 which is fed to rolling bank 515. While a typical method of forming reactive composition 516 is shown, it will be recognized that other suitable methods (for example, mechanical stirring) may also be used. Rolling bank 515 is disposed between first forming web 520 (which passes over roller 542) and second forming webs 521 which is unwound from feed roll 523, although other feed arrangements are also possible (especially if unpainted sheet metal is used as one forming web). While the process depicted is typical for flexible forming webs, it will be recognized that individual sheets of unpainted sheet metal may also be fed into the nip in like manner, but using a different feeding arrangement. First forming web 520 (after passing roller 542) and second forming web 521 advance toward and pass through nip 530.

As first and second forming webs 520, 521 pass through nip 530 formed by first metering element 540 (a platen) and second metering element 535 (a notch bar), entrapped air bubbles 517 are substantially or completely removed to give thin reactive film 550 sandwiched between first and second forming webs 520, 521. First and second metering elements 540, 535 define a nip gap 530.

After passing insulation barrier 560, thin reactive film 550 contacts heated platen 565 which facilitates curing of reactive composition 516 to form thin film 570 sandwiched between first and second forming webs 520, 521.

Paint film composites according to the present disclosure can be made using exemplary process 500 in a variety of permutations. For example, in one embodiment unpainted sheet metal stock may be one forming web and thin film 570 results in color layer 130.

In another exemplary embodiment, both forming webs may be release liners and thin film 570 results in color layer 130. After removing one of the forming webs adhesive is applied to the exposed surface of color layer 130, and the adhesive coated color layer is adhered to an unpainted sheet metal (for example, unpainted sheet metal stock).

In another exemplary embodiment, one forming web may be unpainted sheet metal with a color layer 240 contacting and permanently adhered thereto and the other forming web is a release liner. Thin film 570 results in transparent protective layer 250.

It will be at once apparent that numerous specific combinations are possible. Other forming webs include, for example, adhesive coated unpainted sheet metal and adhesive coated protective liners.

Typically, reactive composition 516 generates heat as it reacts, the temperature of the rolling bank rises to a temperature above ambient. Hence, over time during a continuous process the temperature of rolling bank 515 rises until a steady state temperature is reached that balances heating and cooling effects on the rolling bank. Until the steady state is reached, the gap typically dynamically changes with time, which results in a thin film of varying thickness and profile. To mitigate this problem, at least a portion of at least one of first and second metering elements 540, 535, proximate the rolling bank is independently heated to a temperature, desirably at or above the contemporaneous temperature of the rolling bank, although less heating may also be used. As exemplified in FIG. 5, this may be accomplished using heating tape 585 secured to second metering element 535. This heating has the effect of reducing the time necessary to reach steady state operation and its attendant start up waste, and optionally thin film uniformity, especially in applications where uniform thickness of the thin film is important.

In some embodiments, (for example, those wherein one or both of the first and second forming webs 520, 521 are both release liners) one or both of the first and second forming webs 520, 521 is then removed to expose one or both surfaces of the thin film.

Suitable forming webs include those films which have sufficient integrity and flexibility to form and support the reactive thin film. The forming web may have any thickness as long as it has sufficient integrity and flexibility to be used in methods according to the present invention. In general, the films should be substantially continuous and nonporous, although in some cases, some porosity (for example, microporosity) may be acceptable. Examples of suitable forming webs include papers (including treated papers); foils; and polymeric films such as polyester films (for example, PET polyester films or polycaprolactone films), polycarbonate films, cellulosic films (for example, cellulose films), polyamide films, polyolefin films (for example, polyethylene films or polypropylene films), polyamide films, polyimide films, polyvinyl chloride films, or other polymer films (for example, multilayer films); and combinations thereof.

If one or both of the forming webs is intended to function as a release liner, it may be treated with a release agent such as, for example, a silicone or a fluorochemical. A wide variety of suitable release liners are known in the art, and many are commercially available.

The first and second metering elements may have any suitable form. Exemplary metering elements include bars, notched bars, rolls, platens, slabs, doctor blades, knife edges, and combinations thereof. In general, they should be selected and positioned such that they form a substantially uniform gap prior to formation of the rolling bank.

The method depicted in FIG. 5 can be used to form thin films of a variety of thicknesses (for example, thicknesses up to one millimeter or more).

One or more of the metering elements may be heated directly or indirectly by any appropriate method including, for example, electrical heating (for example, by resistive heating coils or a heating tape), steam, infrared radiation, oil heating, thermal conduction, or induction heating. Heat may be supplied internally or externally to the first and/or second metering elements. Heating may be provided uniformly or non-uniformly along the length(s) of the first and/or second metering elements. For example, one or both of the ends of the metering element(s) may be independently heated more than the portion of the metering element(s) proximate to the rolling bank.

If heated, the temperature of the first and/or second metering elements generally should not be sufficiently high that excessive curing of the rolling bank occurs.

Objects and advantages of this invention are further illustrated by the following non-limiting examples, but the particular materials and amounts thereof recited in these examples, as well as other conditions and details should not be construed to unduly limit this invention.

EXAMPLES

Unless otherwise noted, all parts, percentages, ratios, etc. in the Examples and the rest of the specification are by weight. Table 1, below, lists materials used in the examples.

TABLE 1

| MATERIAL | DESCRIPTION |
|---|---|
| Alberdingk U 933 | a water-based polyurethane available as Alberdingk U 933 from Alberdingk Boley, Greensboro, NC. |
| APU 1014 | acrylic modified polyester-polyurethane dispersion available as Alberdingk APU 1014 from Alberdingk-Boley. |

TABLE 1-continued

| MATERIAL | DESCRIPTION |
| --- | --- |
| Admex 770 | medium-to-high molecular weight polymeric plasticizer based on adipic acid and phthalic acid available as Admex 770 from Velsicol Chemical Corporation, Rosemont, IL. |
| Aluminum AL6111 | 12 inches × 36 inches × 19 mils (0.3 m × 0.9 cm × 0.48 mm) aluminum AL6111 sheet. |
| AMP 95 | 2-amino-2-methyl-1-propanol available as AMP 95 from Angus Chemical Co., Midland, MI. |
| Bayhydrol 122 | a water based polyurethane available as Bayhydrol 122 from Bayer Corp., Pittsburgh, PA. |
| Capa 2054 | a linear polyester diol, molecular weight = 550 g/mole, available as Capa 2054 from Perstorp UK Limited, Warrington, Cheshire, UK. |
| Capa 3031 | a polycaprolactone polyester triol, molecular weight = 300 g/mole, available as Capa 3031 from Perstorp UK Limited. |
| Capa 3050 | a polycaprolactone polyester triol, molecular weight = 540 g/mol, available as Capa 3050 from Perstorp UK Limited. |
| cellulose acetate butyrate-381-0.1 | a leveling agent available as cellulose acetate butyrate-381-0.1 from Eastman Chemical Co. of Kingsport, TN. |
| Cold Rolled Steel C1008 | 12 inches × 36 inches × 23 mils (0.3 m × 0.9 cm × 0.58 mm) cold rolled steel C1008 sheet. |
| Cold rolled steel panel | 4 inches × 12 inches × 32 mils (10 cm × 30 cm × 0.81 mm) cold rolled steel panel available from Act Laboratories, Hillsdale, MI, having a primer (ED5100) e-coated on both sides. |
| Cosorb MOH | UV light absorber available as Cosorb MOH from 3M Company, St. Paul, MN. |
| Cosorb OSG | UV light absorber available as Cosorb OSG from 3M Company. |
| Cromophtal Brown 5R | azo condensate pigment available as Cromophtal Brown 5R from Ciba Specialty Chemicals Corporation, High Point, NC. |
| Dabco T-12 | urethane catalyst, dibutyltin dilaurate, available as Dabco T-12 from Air Products and Chemicals, Allentown, PA. |
| Desmodur N 3300A | aliphatic polyisocyanate based on hexamethylene diisocyanate, equivalent weight = 195 g/eq available as Desmodur N 3300A from Bayer Corp., Pittsburgh, PA |
| Desmodur N 3390 | aliphatic polyisocyanate based on hexamethylene diisocyanate, equivalent weight = 214 g/eq available as Desmodur N 3390 from Bayer Corp. |
| Desmodur N 3600 | aliphatic polyisocyanate based on hexamethylene diisocyanate, equivalent weight = 183 g/eq available as Desmodur N 3600 from Bayer Corp. |
| Desmodur W | bis(4-isocyanatocyclohexyl)methane diisocyanate available as Desmodur W from Bayer Corp. |
| Disperplast P | high molecular weight unsaturated polycarboxylic acid pigment dispersing agent available as Disperplast P from BYK-Chemie USA, Wallingford, CT. |
| DMA | N,N-dimethylacrylamide |
| EC3960 | epoxy primer available as Scotch-Weld Structural Adhesive Primer EC-3960 from 3M Company, St. Paul, MN. |
| Edenol 9777 | polymeric plasticizer based on 1,3-butanediyl polyadipate with 2-ethylhexanol available as Edenol 9777 from Cognis Oleochemicals LLC, Cincinnati, OH. |
| Ferro Black | 15-40 weight percent carbon black dispersed in unsaturated polyester, available as Ferro Black (color no. 11-8805) from Ferro Corp., Edison, NJ. |
| Fomrez 55-112 | a polyester diol based on neopentyl glycol adipate, molecular weight = 1000 g/mole, available as Fomrez 55-112 from Chemtura Corp., Middlebury, CT. |
| Fomrez 55-225 | a polyester diol based on neopentyl glycol adipate, molecular weight = 500 g/mole, available as Fomrez 55-225 from Chemtura Corp., Middlebury, CT. |
| HEA | 2-hydroxyethyl acrylate available from Cognis, Cincinnati, OH. |
| Irgacolor Yellow 2GLMA | bismuth vanadate pigment available as Irgacolor Yellow 2GLMA from Ciba Specialty Chemicals Corporation, High Point, NC. |
| Joncryl-578 | an acrylic polyol available as Joncryl-578 from BASF Corp., Florham Park, NJ. |
| Keyplast FL Yellow FPGN | fluorescent dye available as Keyplast FL Yellow FPGN from Keystone Aniline Corporation, Chicago, IL. |

TABLE 1-continued

| MATERIAL | DESCRIPTION |
| --- | --- |
| K-Flex 188 | a polyester diol, molecular weight = 488 g/mole, available as K-Flex 188 from King Industries Inc., Norwalk, CT. |
| K-Flex XM-308 | a linear, saturated polyester diol, molecular weight = 432 g/mole, available as K-Flex XM-308 from King Industries Inc., Norwalk, CT. |
| Macromelt 6240 | polyamide polymer hot melt adhesive available as Macromelt MM-6240 from Henkel, Mississauga, ON, Canada. |
| Macromelt MM-6240 | polyamide polymer hot melt adhesive available as Macromelt MM-6240 from Henkel Adhesives, Elgin, IL. |
| Metacure T-12 | dibutyltin dilaurate catalyst available as Metacure T-12 from Air Products and Chemicals, Allentown, PA. |
| Monolite Green 674 | copper phthalocyanine pigment available as Monolite Green 674 from Heucotech Ltd., Fairless Hills, PA. |
| Neocryl CX-100 | a polyaziridine crosslinker available as Neocryl CX-100 from DSM NeoResins of Wilmington, MA. |
| Orange 11Y692 | orange pigment dispersion available as Orange 11Y692 from Penn Color, Doylestown, PA. |
| Paraloid EXL2600 | a methacrylate/styrene/butadiene core-shell polymer available as Paraloid EXL2600 from Rohm and Haas Co., Philadelphia, PA. |
| PC-1667 | a polycarbonate diol, molecular weight 860 g/mole, available as PC-1667 from Stahl USA, Peabody, MA. |
| Raven 1200 Black | black pigment dispersion, 10% Raven 1200 carbon black from Evonik-Degussa, Chester, PA, in 90% Fomrez 55-225. |
| RD 2788 | an automotive grade acrylic pressure-sensitive adhesive transfer tape |
| Reversacol Graphite | photochromic dye available as Reversacol Graphite from Keystone Aniline Corporation, Chicago, IL. |
| 4298 UV | an adhesion promoter available as Scotch-Mount 4298 UV Adhesion Promoter from 3M Company. |
| Silberline GP 142 SV | silver holographic flake pigment, 12 micrometers × 100 micrometers × 50 micrometers, available as Silberline GP 142 SV from Silberline, Tamaqua, PA. |
| Stainless Steel 304 | 12 inches × 36 inches × 17 mils (0.3 m × 0.9 cm × 0.43 mm) stainless steel 304 sheet. |
| T10 Release Liner | a 2-mil (50-micrometer) single side release (silicone coated) polyester liner, available as Clearsil Release Liner T10 from CPFilms, Martinsville, VA. |
| Tinuvin 123 | bis-(1-octyloxy-2,2,6,6-tetramethyl-4-piperidinyl) ester available as Tinuvin 123 from Ciba Specialty Chemicals, Tarrytown, NY. |
| Tinuvin 292 | bis(1,2,2,5,6-pentamethyl-4-piperidinyl) sebacate available as Tinuvin 292 from Ciba Specialty Chemicals. |
| Tinuvin 328 | a UV light absorber, 2-(2H-benzotriazol-2-yl)-4,6-ditertpentylphenol available as Tinuvin 328 from Ciba Specialty Chemicals. |
| Tinuvin 405 | UV light absorber, 2-[4-[(2-hydroxy-3-(2'-ethyl)hexyl)oxy]-2-hydroxyphenyl]-4,6-bis(2,4-dimethylphenyl)-1,3,5-triazine available as Tinuvin 405 from Ciba Specialty Chemicals. |
| TI-PURE R-960 | titanium dioxide pigment available as TI-PURE R-960 from E. I. du Pont de Nemours and Co., Wilmington, DE. |
| TMPTA | trimethylolpropane triacrylate available from Sartomer Co., Exton, PA. |
| Tone 2221 | a linear polycaprolactone polyol, molecular weight = 1000 g/mole, available as Tone 2221 from Dow Chemical Co., Midland, MI. |

TABLE 1-continued

| MATERIAL | DESCRIPTION |
|---|---|
| Tone 301 | a caprolactone triol, molecular weight = 300 g/mole, available as Tone 301 from Dow Chemical Co. |
| Tone 305 | a caprolactone triol, molecular weight = 550 g/mole, available as Tone 305 from Dow Chemical Co. |
| Triton GR-7M | a surfactant available as Triton GR-7M from Dow Chemical Co., Midland, MI. |
| Urethhall 4050-55 | a polyester diol, molecular weight = 2040 g/mole, available as Urethhall 4050-55 from HallStar Co., Chicago, IL. |
| Uvitex OB | optical brightener available as Uvitex OB from Ciba Specialty Chemicals Corporation, High Point, NC. |

Series 100 Examples

Preparative Example 101

A pigment dispersion paste was prepared that consisted of 19.8 parts of Cromophtal Brown 5R pigment, 0.99 part Disperplast P and 79.21 parts ADMEX 770. This mixture was first blended using a paddle mixer until a uniform consistent paste condition was reached, then ground using a 3-roll paint mill until a pigment grind of greater than or equal to 7.0 was reached according to ASTM D1210-05 "Standard Test Method for Fineness of Dispersion of Pigment-Vehicle Systems by Hegman-Type Gage".

Preparative Example 102

A pigment dispersion paste was prepared as described in Preparative Example 101, except the mixture consisted of 22.87 parts Monolite Green 674, 0.91 part Disperplast P, and 76.22 parts ADMEX 770.

Preparative Example 103

A pigment dispersion paste was prepared as in Preparative Example 101 except the mixture consisted of 54.64 parts Irgacolor Yellow 2GLMA, 2.73 parts Disperplast P, and 42.63 parts ADMEX 770.

Preparative Example 104

A pigment dispersion paste was prepared as described in Preparative Example 101, except the mixture consisted of 57.8 parts TI-PURE R-960, 1.7 parts Disperplast P, and 40.5 parts Edenol 9777.

Preparative Example 105

A dye mixture was prepared by dissolving 1 part Reversacol Graphite dye into 99 parts K-Flex 188. The mixture was placed in a 70° C. oven for 24 hours which resulted in the dissolution of the dye in the K-Flex 188.

Preparative Example 106

A centrifugal resin mixer available as FlackTek Speedmixer DAC 150 FV from FlackTek Inc., Landrum, S.C., was used to mix 9.63 grams of K-Flex 188 with 8 grams of Desmodur N 3300A and 0.0368 grams of Dabco T-12 at a speed of 3450 rpm in a Max 40 mixing cup, available from FlackTek Inc. The mixture was then coated using a notched bar flatbed coating apparatus, as generally shown in FIG. 5, using a T10 silicone release coated, 63.5 micrometer thickness polyester release liner (CPFilms Inc., Martinsville, Va.) both above and below the coating mixture. The thickness of the gap between the notched bar and the flatbed was set at 127 micrometers. The mixture was poured onto the flatbed portion of the coating apparatus and the liners were pulled through the gap which created a rolling bank of the coating mixture. After going through the gap, the sample between the two liners was set aside and allowed to cure under ambient conditions for a minimum of 24 hours. The resulting film was a crosslinked polyurethane with a system functionality of 2.51 and with an isocyanate to polyol ratio of 1.05.

Preparative Examples 107-116

Preparative Example 106 was repeated for each example, except that the stoichiometric percentages of K-Flex 188 were replaced with 2-ethylhexanol for the purpose of reducing the system functionality, and hence the crosslink density of the polyurethane composition. The compositions of Examples 106-116 are reported in Table 101 below:

TABLE 101

| Preparative Example | K-Flex 188 | 2-ethyl-hexanol | Dabco T-12 | Desmodur N 3300A | System Functionality | NCO/OH equivalent ratio |
|---|---|---|---|---|---|---|
| 106 | 9.63 | 0 | 0.0368 | 8.0 | 2.51 | 1.05 |
| 107 | 9.15 | 0.26 | 0.0368 | 8.0 | 2.43 | 1.05 |
| 108 | 8.67 | 0.51 | 0.0368 | 8.0 | 2.36 | 1.05 |
| 109 | 8.19 | 0.77 | 0.0368 | 8.0 | 2.30 | 1.05 |
| 110 | 7.71 | 1.03 | 0.0368 | 8.0 | 2.23 | 1.05 |
| 111 | 7.22 | 1.28 | 0.0368 | 8.0 | 2.17 | 1.05 |
| 112 | 6.74 | 1.54 | 0.0368 | 8.0 | 2.12 | 1.05 |
| 113 | 6.26 | 1.8 | 0.0368 | 8.0 | 2.06 | 1.05 |

TABLE 101-continued

| Preparative Example | K-Flex 188 | 2-ethyl-hexanol | Dabco T-12 | Desmodur N 3300A | System Functionality | NCO/OH equivalent ratio |
|---|---|---|---|---|---|---|
| 114 | 5.78 | 2.05 | 0.0368 | 8.0 | 2.01 | 1.05 |
| 115 | 5.3 | 2.31 | 0.0368 | 8.0 | 1.97 | 1.05 |
| 116 | 4.82 | 2.57 | 0.0368 | 8.0 | 1.92 | 1.05 |

The films from Preparative Examples 106-116 were then cut into dog bone shaped samples in both the downweb or machine direction (MD, in the direction of coating) and crossweb or cross-direction (CD) orientations and tested according to ASTM D882-02 "Standard Test Method for Tensile Properties of Thin Plastic Sheeting", with a 0.635 centimeter wide dog bone specimen, a crosshead gap setting of 5.1 cm and a crosshead speed of 25.4 centimeters per minute. The MD and CD tensile properties of the films are shown in Table 102 (below), wherein three replicates were tested and averaged for each film with the standard deviation shown in parentheses.

TABLE 102

| Preparative Example | Thickness, micrometers | Peak Tensile Strength, MPa | | Elongation at Break, % | | Young's Modulus, MPa | |
|---|---|---|---|---|---|---|---|
| | | Machine Direction | Crossweb Direction | Machine Direction | Crossweb Direction | Machine Direction | Crossweb Direction |
| 106 | 127 | 33.1 (0.7) | 29.6 (3.4) | 85 (6) | 78 (12) | 490 (18) | 442 (37) |
| 107 | 127 | 31.0 (2.8) | 31.7 (3.4) | 98 (2) | 100 (13) | 327 (46) | 291 (43) |
| 108 | 127 | 28.3 (1.4) | 22.8 (1.4) | 107 (19) | 84 (15) | 128 (148) | 248 (87) |
| 109 | 127 | 24.1 (0.7) | 27.6 (2.1) | 114 (5) | 133 (8) | 93 (106) | 35 (3) |
| 110 | 127 | 22.1 (2.1) | 26.2 (2.8) | 154 (8) | 157 (6) | 30 (3) | 36 (4) |
| 111 | 114 | 21.4 (2.1) | 22.1 (1.4) | 169 (8) | 172 (6) | 34 (3) | 32 (4) |
| 112 | 114 | 14.5 (0.7) | 39.3 (43) | 178 (2) | 137 (78) | 23 (1) | 475 (780) |
| 113 | 114 | 9.6 (0.7) | 10.3 (0.7) | 196 (10) | 201 (4) | 17 (2) | 16 (4) |
| 114 | 114 | 5.5 (0.7) | 5.5 (0.7) | 218 (6) | 222 (2) | 7 (2) | 9 (1) |
| 115 | 114 | 3.4 (0.0) | 4.1 (0.7) | 238 (6) | 240 (8) | 4 (0.3) | 6 (2) |
| 116 | 102 | 1.4 (0.0) | 2.1 (0.0) | 245 (57) | 272 (12) | 6 (1) | 1.5 (0.1) |

The tensile properties of Preparative Examples 106-116 demonstrate that within experimental error there is no significant tensile property difference for any of the samples based on direction, indicating that the films of Preparative Examples 106-116 are mechanically isotropic with respect to length and width.

Preparative Examples 117-126

The procedure of Preparative Example 106 was repeated, except using compositions reported in Table 103 (below), wherein K-Flex 188 was replaced with Urethhall 4050-55, and glycerol was used as a means of increasing the system functionality of the composition, and hence the crosslink density, and Desmodur N 3300A was replaced with Desmodur W.

TABLE 103

| Preparative Example | Urethhall 4050-55 | glycerol | Dabco T-12 | Desmodur W | System Functionality | NCO/OH equivalent ratio |
|---|---|---|---|---|---|---|
| 117 | 14.83 | 0 | 0.0368 | 2 | 2.0 | 1.05 |
| 118 | 13.35 | 0.04 | 0.0368 | 2 | 2.03 | 1.05 |
| 119 | 11.86 | 0.09 | 0.0368 | 2 | 2.07 | 1.05 |
| 120 | 10.38 | 0.13 | 0.0368 | 2 | 2.10 | 1.05 |
| 121 | 13.35 | 0.27 | 0.0368 | 3 | 2.14 | 1.05 |
| 122 | 11.12 | 0.33 | 0.0368 | 3 | 2.17 | 1.05 |
| 123 | 11.86 | 0.54 | 0.0368 | 4 | 2.22 | 1.05 |
| 124 | 11.12 | 0.78 | 0.0368 | 5 | 2.26 | 1.05 |
| 125 | 8.9 | 1.07 | 0.0368 | 6 | 2.3 | 1.05 |
| 126 | 5.19 | 1.41 | 0.0368 | 7 | 2.34 | 1.05 |

The tensile properties of Preparative Examples 117-126 were measured as in Preparative Examples 106-116 hereinabove with the results reported in Table 104 (below), wherein three replicates were tested and averaged for each film with the standard deviation shown in parentheses.

TABLE 104

| Film of Preparative Example | Thickness, micrometers | Peak Tensile Strength, MPa | | Elongation at Break, % | | Young's Modulus, MPa | |
|---|---|---|---|---|---|---|---|
| | | Machine Direction | Crossweb Direction | Machine Direction | Crossweb Direction | Machine Direction | Crossweb Direction |
| 112 | 114 | 13.1 (0.7) | 15.2 (4.9) | 777 (22) | 788 (64) | 7.5 (1.2) | 8.4 (2.0) |
| 113 | 114 | 22.8 (4) | 17.9 (0.7) | 740 (47) | 698 (54) | 12.9 (3.1) | 10.5 (2.9) |
| 114 | 127 | 21.4 (4) | 17.9 (3.4) | 662 (32) | 622 (11) | 14 (3.2) | 11.4 (1.8) |
| 115 | 114 | 22.1 (8) | 15.9 (2.8) | 578 (35) | 549 (37) | 16 (6) | 12.1 (1.5) |
| 116 | 114 | 23.4 (12) | 10.3 (8.3) | 521 (3) | 401 (113) | 17 (8.5) | 8.6 (7.6) |
| 117 | 102 | 25.5 (5.5) | 32.4 (12) | 421 (19) | 454 (49) | 20 (4.4) | 26 (10) |
| 118 | 102 | 38.6 (2.1) | 43.4 (4.1) | 384 (12) | 400 (12) | 32 (7.1) | 35 (3.8) |
| 119 | 102 | 44.8 (2.8) | 33.1 (19) | 298 (10) | 244 (67) | 33 (0.7) | 29 (12) |
| 120 | 102 | 31.7 (8.3) | 22.1 (2.8) | 149 (39) | 96 (25) | 245 (11) | 256 (13) |
| 121 | 102 | 35.8 (14) | 44.1 (2.8) | 7.3 (4.3) | 7.4 (0.4) | 780 (56) | 869 (3.3) |

The tensile properties of Preparative Examples 117-126 demonstrate that within experimental error there is no significant tensile property difference for any of the samples based on direction, indicating that the films of Preparative Examples 112-121 are mechanically isotropic with respect to length and width.

Preparative Example 127

A 75 micrometer thick impact modified polypropylene film available as PP7035.E4 from ExxonMobil Corp., Irving, Tex., was primed according to the following procedure. The film was air corona treated on both sides with 2.5 kiloWatts of energy and then fed to a gravure roll coater equipped with a 400 lines per inch quad patterned gravure cylinder and coated with a solution of 80% HEA and 20% TMPTA containing 0.01 part per hundred by weight (phr) of Keyplast FL Yellow FPGN at a linespeed of 30.5 meters per minute. The web was then exposed to an electron beam source which delivered 5 Megarads of radiation at 175 kiloVolts accelerating voltage at 101 milliAmps of current. During and after exposure, the 2-hydroxyethyl acrylate was chemically grafted and polymerized to the polypropylene film and wound into rolls.

Preparative Example 128

A 75 micrometer thick impact modified polypropylene film available as PP7035.E4 from ExxonMobil Corp., Irving, Tex., was primed according to the following procedure. The uncoated side of the electron beam primed film from Preparative Example 127 was coated with a solution containing 0.01 phr of Uvitex OB in an 80/20 solution of DMA and TMPTA, using a 400 lines per inch quad patterned gravure cylinder at 30.5 meters per minute and sequentially exposed to 4 Megarads of electron beam radiation at an accelerating voltage of 175 kiloVolts and a current of 81 milliAmps Example 101

467 MP Acrylic Transfer Tape available from 3M Company, St. Paul, Minn., was laminated to the polyurethane film from Preparative Example 101 using a 2 inch (5 cm) wide rubber roller. A sample was cut from the film with a width of approximately 2.0 centimeters. The paper liner of the transfer tape was then removed from the sample and the laminate was then adhered to a metal panel painted with Stainguard V paint, available from ACT Laboratories, Hillsdale, Mich. The sample was then clamped in a metal bending brake and bent to a 90 degree angle. This produced a radius of curvature of 0.2 centimeters. The sample passed this test with no visible surface distortion or cracking of the film. An identical panel was prepared and clamped in a metal bending brake and bent to an angle of 135 degrees. This produced a radius of curvature of 0.076 centimeters. The sample passed this test with no visible surface distortion or cracking of the film.

The same lamination and bending procedure was performed on the films from Preparative Examples 107 through 128. All of these samples initially passed both the 90 degree and 135 degree metal brake bending tests with no visible surface distortion or cracking of the film. The samples were then reinspected after 24 hours and the films from Preparative Examples 115 and 116 were observed to have broken across the outside bending radius of the metal panel. In all instances the paint was observed to crack under the pressure sensitive adhesive film laminate.

Example 102

Polyurethane film samples from Preparative Examples 106 through 126 were adhesively attached to one (1) mm thick cold rolled steel metal support panels using 77 Spray Adhesive available from 3M Company, St. Paul, Minn., to form a film-bonded panel. Each film-bonded panel was evaluated for scratch resistance according to DaimlerChrysler specification LP-463DD-18-01. A scratch and mar tester obtained from Taber Industries, Tonawanda, N.Y. was used to perform the test with a 1.0 millimeter scratch tip. The scratch resistance was determined by individual probes containing different weights that correspond to 5 Newtons, 7 Newtons, 10 Newtons, 15 Newtons, and 20 Newtons of force. The results were determined by specifying the scratch resistance on a scale of 1.0 to 5.0:1.0=no scratch; 2.0=very slight scratch; 3.0=slight scratch; 4.0=moderate scratch; 5.0=severe scratch. The results are shown in Tables 105-107 below. The type of scratch is noted using the following abbreviations: ns=no scratch, vvs=very very slight, vs=very slight, s=slight, m=moderate, sev=severe and no=none. Comments are reported as appropriate.

TABLE 105

| Film of Preparative Example | | 5 Newtons | 7 Newtons | 10 Newtons | 15 Newtons | 20 Newtons |
|---|---|---|---|---|---|---|
| 105 | rating | 1.5 | 1.5 | 1.5 | 4.5 | 5.0 |
| | scratch | vvs | vvs | vvs | sev | sev |
| | comments | — | — | — | — | — |
| 107 | rating | 2.0 | 2.0 | 2.0 | 2.0 | 3.0 |
| | scratch | vs | vs | vs | vs | s |
| | comments | — | — | — | — | — |
| 108 | rating | 2.0 | 2.0 | 2.0 | 2.0 | 5.0 |
| | scratch | vs | vs | vs | vs | sev |
| | comments | — | — | — | — | ripped |
| 109 | rating | 3.0 | 3.0 | 3.0 | 3.0 | 5.0 |
| | scratch | s | s | s | s | sev |
| | comments | — | — | — | — | — |
| 110 | rating | 3.0 | 3.0 | 3.0 | 3.0 | 5.0 |
| | scratch | s | s | s | s | sev |
| | comments | — | — | — | — | ripped |
| 111 | rating | 3.0 | 3.0 | 3.0 | 3.0 | 5.0 |
| | scratch | s | s | s | s | sev |
| | comments | — | — | — | — | ripped |
| 112 | rating | 3.0 | 3.0 | 3.0 | 5.0 | 5.0 |
| | scratch | s | s | s | sev | sev |
| | comments | — | — | — | ripped | ripped |
| 113 | rating | 3.0 | 3.0 | 4.0 | 5.0 | 5.0 |
| | scratch | s | s | m | sev | sev |
| | comments | — | — | — | ripped | ripped |
| 114 | rating | 3.0 | 3.0 | 5.0 | 5.0 | 5.0 |
| | scratch | s | s | sev | sev | sev |
| | comments | — | — | ripped | ripped | ripped |
| 115 | rating | 3.0 | 5.0 | 5.0 | 5.0 | 5.0 |
| | scratch | s | sev | sev | sev | sev |
| | comments | — | ripped | ripped | ripped | ripped |
| 116 | rating | 4.0 | 5.0 | 5.0 | 5.0 | 5.0 |
| | scratch | m | sev | sev | sev | sev |
| | comments | — | ripped | ripped | ripped | ripped |
| 117 | rating | 5.0 | 5.0 | 5.0 | 5.0 | 5.0 |
| | scratch | sev | sev | sev | sev | sev |
| | comments | ripped | ripped | ripped | ripped | ripped |
| 118 | rating | 5.0 | 5.0 | 5.0 | 5.0 | 5.0 |
| | scratch | sev | sev | sev | sev | sev |
| | comments | ripped | ripped | ripped | ripped | ripped |
| 119 | rating | 5.0 | 5.0 | 5.0 | 5.0 | 5.0 |
| | scratch | sev | sev | sev | sev | sev |
| | comments | ripped | ripped | ripped | ripped | ripped |
| 120 | rating | 2.0 | 4.5 | 5.0 | 5.0 | 5.0 |
| | scratch | vs | sev | sev | sev | sev |
| | comments | — | — | ripped | ripped | ripped |
| 121 | rating | 1.5 | 4.5 | 5.0 | 5.0 | 5.0 |
| | scratch | vvs | sev | sev | sev | sev |
| | comments | — | — | ripped | ripped | ripped |
| 122 | rating | 1.5 | 5.0 | 5.0 | 5.0 | 5.0 |
| | scratch | vvs | sev | sev | sev | sev |
| | comments | — | ripped | ripped | ripped | ripped |
| 123 | rating | — | 5.0 | 5.0 | 5.0 | 5.0 |
| | scratch | — | sev | sev | sev | sev |
| | comments | inconclusive | ripped | ripped | ripped | ripped |
| 124 | rating | 2.0 | 2.0 | 4.5 | 3.0 | 4.0 |
| | scratch | vs | vs | sev | s | m |
| | comments | — | — | some ripped | — | — |
| 125 | rating | 2.0 | 2.0 | 3.0 | 3.0 | 3.0 |
| | scratch | vs | vs | s | s | s |
| | comments | — | — | — | — | — |
| 126 | rating | 1.0 | 1.0 | 2.0 | 3.0 | 3.0 |
| | scratch | ns | ns | vs | s | s |
| | comments | — | — | — | — | — |

Glass Transition Measurements

The polyurethane film samples from Preparative Examples 106-126 were tested using a Differential Scanning calorimeter Model Q100 manufactured by TA Instruments, Newcastle, Del., to determine the glass transition temperature ($T_g$) in degrees Celsius of each film composition. The results are reported in Table 106 (below).

TABLE 106

| Film of Preparative Example | $T_g$, °C. |
|---|---|
| 106 | 32.60 |
| 107 | 26.75 |
| 108 | 30.33 |
| 109 | 24.13 |
| 110 | 17.74 |
| 111 | 15.01 |
| 112 | 13.3 |
| 113 | 10.64 |
| 114 | 6.94 |
| 115 | 4.34 |
| 116 | 1.48 |
| 117 | −47.05 |
| 118 | −46.48 |
| 119 | −46.08 |
| 120 | −46.33 |
| 121 | −46.44 |
| 122 | −46.28 |
| 123 | −46.53 |
| 124 | −47.81 |
| 125 | −49.44 |
| 126 | not measured |

Preparative Example 129

A crosslinked polyurethane film was prepared according to Preparative Example 106, except that 0.1 gram of Silberline GP 142 SV Silver Holographic flake pigment was added to the mixture prior to mixing the components. The mixture was mixed and coated into a film using a 152 micrometer gap and allowed to cure for at least 24 hours. The top release liner was then removed and 467 MP Acrylic Transfer Tape available from 3M Company was laminated to the film. A 2.54 cm wide sample was cut from the film and then laminated to the surface of the crosslinked polyurethane film produced in Preparative Example 130. This produced a metallic looking black film with high gloss and of high quality.

Example 103

A pigment dispersion blend was prepared comprising 60.1% of Preparative Example 103, 24.33% of Preparative Example 102, 13.45% of Preparative Example 104, and 2.12% of Preparative Example 101 by mixing for one minute at 3450 rpm using the FlackTek Speedmixer of Preparative Example 106. One gram of the pigment dispersion blend was incorporated into the composition of Preparative Example 106 and coated into a pigmented opaque polyurethane film according to Preparative Example 106. After at least 24 hours, the top silicone coated release liner was removed from the pigmented opaque polyurethane film and 467 MP Acrylic Transfer Tape available from 3M Company was laminated to the surface of the pigmented opaque polyurethane film. A 2.54 cm by 2.54 cm sample was cut from the film and the paper release liner utilized on the 467 MP Acrylic Transfer Tape available from 3M Company was removed and the sample was bonded to a 178 micrometer thick aluminum house flashing sheet metal.

Preparative Example 130

A crosslinked polyurethane film was prepared by mixing together 19.43% Fomrez 55-225, 12.33% Fomrez 55-112, 16% Tone 0301, 0.14% Dabco T-12, and 1.5% Raven 1200 Black dispersion. This composition was mixed together until the distribution of black pigment was visually uniform. Desmodur N 3300A (50.6 wt %) was then added, mixed and coated with a 127 micrometer gap according to Preparative Example 106. This produced a crosslinked black polyurethane film that was glossy with a rich black appearance.

Example 104

The top polyester release liner from the crosslinked black polyurethane film of Preparative Example 129 was removed and overcoated with the solution from Preparative Example 129 and allowed to cure. 467 MP Acrylic Transfer Tape available from 3M Company was then laminated to the opposite side of the crosslinked black polyurethane film. The opposing release liner was removed and the adhesive layer laminated to a metal panel which resulted in a metallic, black crosslinked polyurethane film that was glossy. The visual appearance of this film, when compared to the crosslinked polyurethane of Preparative Example 129, was identical even though the process used to produce the film was significantly different.

Preparative Example 131

A 7.62 micrometer thick sample of Macromelt MM-6240 was extrusion coated onto a polycoated paper liner and utilized as the bottom liner of Preparative Example 106. A mixture was prepared as in Preparative Example 106, except that 1.0 grams of the pigment dispersion blend prepared in Preparative Example 129 was added. The mixture was then coated into a film according to Preparative Example 106.

Preparative Example 132

A 7.62 micrometer thick sample of Macromelt MM-6240 was laminated at room temperature to 467 MP Acrylic Transfer Tape available from 3M Company. The paper liner was removed from the Macromelt MM-6240 to create a primed pressure-sensitive adhesive film. The primed pressure-sensitive adhesive film was then coated with the mixture of Preparative Example 106, except that 1.0 gram of Orange 11Y692 pigment dispersion was added to the Preparative Example 106 mixture just prior to mixing.

Example 105

A crosslinked polyurethane film was made as in Preparative Example 106, except that 9.7 grams of the composition prepared in Preparative Example 105 were substituted for the K-Flex 188. The sample was allowed to cure to "handling strength" which resulted in a photochromic crosslinked polyurethane film. Both the top and bottom liners were removed from the film. The film appeared to be transparent and essentially colorless. The film was then exposed to direct sunlight resulting in a transformation into a very dark colored film. Stretching and deforming the film did not produce any visual lightening due to the stretching. The film was then returned to indoor lighting conditions resulting in a transformation back to a transparent and essentially colorless photochromic crosslinked polyurethane film.

One release liner of the 467 MP Acrylic Transfer Tape available from 3M Company was removed and the adhesive was laminated to the surface of the photochromic crosslinked polyurethane film. The remaining liner of the 467 MP Acrylic Transfer Tape available from 3M Company was removed and the sample was laminated to an aluminum panel.

Series 200 Examples

Film Preparation for Testing Procedure

For the determination of metal bending evaluation and Erichsen scratch resistance, films of about 100 micrometer thickness were made according to Film Coating Procedure 200 with polyester film used as both the top and bottom liners.

For testing tensile and elongation properties, both liners were removed and 2.54 cm wide samples were prepared.

For metal bending, environmental cycling, accelerated weathering, and Erichsen scratch resistance tests, one of the liners was removed and the exposed side of the film was laminated to RD 2788 adhesive between two rolls with a nip pressure of 30 psi (130 N). The laminated samples were conditioned for one day before laminating the adhesive side to an unpainted sheet metal panel for metal bending and scratch resistance evaluation. The lamination of the film to the unpainted sheet metal was done between two rolls with a nip pressure of 30 psi (130 N). The laminate was conditioned at room temperature for one day and the top liner was removed before carrying out further tests.

Metal Bending Test

Metal bending evaluation was done on film laminated to metal. Cold rolled steel panels used for the metal bending test were obtained from ACT Laboratories, Hillsdale, Mich., as 4-inch×12-inch (10-cm×30-cm) panels with a thickness of 32 mils (0.81 mm) The steel had a primer (ED5100) e-coated on both sides. The steel panels were cut into 4-inch×1-inch (10-cm×1.3-cm) steel coupons for the metal bending test.

The film/metal laminate was bent with a metal bender to form a shape that had an internal bending angle of 45 degrees and an internal bending radius of 0.031 inch (0.79 mm). The film was observed after one day for any crack formation. A film sample was rated as "pass" if there was no tear in the film (near the bend) through which the metal substrate underneath was visible. A film sample was rated as "fail" if there was even a slight visible tear in the film near the bend.

Erichsen Scratch/Indentation Resistance Test

Erichsen scratch/indentation resistance testing was done on film laminated to metal. The scratch/indentation resistance testing was done using a scratch/indentation hardness tester available as Hardness Test Rod 318 obtained from T. J. Bell, Akron, Ohio. The hardness test rod was set to 2 N, 5 N, 7.5 N, 10 N and 15 N and a scratch/indentation was made on the desired test sample. The scratch/indentation was observed after 16 hours and then rated according to the scratch/indentation rating scale. In Table 205, the scratch/indentation made at various force loads is reported. In some cases, the scratch/indentation was observed over a period of several days to see if the scratch/indentation healed over a period of time. Scratch/indentation ratings were based on the following scale: 6—scratch/indentation not visible; 5—scratch/indentation very slightly visible; 4—scratch/indentation slightly visible; 3—scratch/indentation visible; 2—deep scratch/indentation visible; 1—film tear.

Tensile and Elongation Properties Test

Tensile and elongation testing was performed on coated liner composite films after removing the top and bottom liners and was measured with a force measurement device available as MTS Renew Upgrade Instron, model 1122, from MTS Systems Corp., Eden Prairie, Minn., equipped with a 200 lb (890 N) load cell. The jaw gap between the crossheads was fixed at 4 inches (10 cm) and a crosshead speed of 20 in/min (50 cm/min) was used. Film samples of one inch (1.3 cm) width were used in the tensile and elongation tests.

Environmental Cycling Test

The environmental cycling test was done on a film/metal laminate. The laminate was bent with a metal bender as described in the metal bending test above and the bent samples were aged in the environmental chamber for 1008 hrs. Each cycle in the environmental chamber had the following conditions and the cycles were repeated over a 1008 hour period.

Conditions during each cycle in the environmental chamber were:

17 hours at −30° C., 72 hours at 80° C., 24 hours at 38° C. and 100% relative humidity, 7 hours at −30° C., 17 hours at 38° C. and 100% relative humidity, 7 hours at 80° C., 24 hours at 38° C. and 100% relative humidity.

A film sample was rated as "pass" if there was no evidence of cracking, loss of adhesion or other mode of failure after 1008 hours in the environmental chamber.

Accelerated Weathering Test

The accelerated weathering test was done on film/metal laminates according to standard SAE J1960 test. Film color and gloss, before and after exposure, were measured. The colorimeter used to measure color shift was a Spectraflash SF600 Plus CT from Datacolor International, Lawrenceville, N.J. The 60 degree gloss change was measured with a Micro-TRI-Gloss from BYK-Gardner Inc., USA-Silver Spring, Md.

Gardner Impact Test

Gardner Impact testing was done according to ASTM D5420-04 "Standard Test Method for Impact Resistance of Flat, Rigid Plastic Specimen by means of a Striker Impacted by a Falling Weight (Gardner Impact)", except that the indicated substrate was used. A sample was rated "pass" if there was no evidence of cracking, loss of adhesion or other mode of failure when impacted from either side. The impact test was done at 23° C. and at −29° C.

Film Coating Procedure 200

Polyurethane films were prepared using the coating apparatus as generally shown in FIG. 5 and the procedure described above in Preparative Example 106. The notched bar was heated using fluid heated at 120° F. (49° C.) circulated through the notched bar. Twelve-inch (30-cm) wide forming webs were used as both the top and bottom liners. The films were coated at a line speed of 5 feet per minute (1.5 m/min). The heated platen 565 had 5 zones, each 4 feet (1.2 m) long. The temperature of the first 4 zones was set to 180° F. (82.2° C.) while the last zone was at room temperature. The unwind tension for the top and bottom liners, and the rewind tension for the resultant coated film were all set to 20 lbs (89 N). The gap between the two liners at the nip formed by the notched bar and the flatbed was set to 4 mils (0.1 mm). After the film was coated and wound into a roll, it was conditioned at room temperature for at least 3 days prior to evaluation.

Two-Part Urethane Formulations 201 to 205

Table 202 below shows the formulations that were combined as Part A and Part B in Examples 201-218.

TABLE 202

| | Charge | Material | Formulation, parts | | | | |
| --- | --- | --- | --- | --- | --- | --- | --- |
| | | | 201 | 202 | 203 | 204 | 205 |
| Part A | 1 | Fomrez 55-112 | 50.3 | 57.3 | 62.3 | 17.8 | 17.8 |
| | 2 | Fomrez 55-225 | 0 | 0 | 0 | 7 | 36 |
| | 3 | Capa 3031 | 0 | 0 | 0 | 31 | 31 |
| | 4 | 1,4-butanediol | 23.5 | 16.5 | 11.5 | 0 | 0 |
| | 5 | Tinuvin 292 | 3 | 3 | 3 | 6 | 6 |
| | 6 | Tinuvin 405 | 3 | 3 | 3 | 6 | 6 |
| | 7 | Tinuvin 328 | 0 | 0 | 0 | 3 | 3 |
| | 8 | Dabco T-12 | 0.2 | 0.2 | 0.2 | 0.2 | 0.2 |
| | 9 | 34B662 Black Pigment Dispersion | 20 | 20 | 20 | 29 | 0 |
| Part B | 10 | Desmodur W | 95 | 82 | 68 | 0 | 0 |
| | 11 | Fomrez 55-112 | 5 | 18 | 32 | 0 | 0 |
| | 12 | Desmodur N 3300 A | 0 | 0 | 0 | 100 | 100 |
| Hard Segment, wt % | | | 59.3 | 49.3 | 39.8 | 65.5 | 66.5 |

Preparation of Clear Coat 201

A solvent blend was prepared in a glass jar by adding 6.42 grams of methyl isobutyl ketone, 6.38 grams of n-butyl acetate, 37.6 grams of xylene, and 14.8 grams of propylene glycol methyl ether acetate. While the solvent blend was being agitated, 2 grams of cellulose acetate butyrate-381-0.1, 17.57 grams of Joncryl-578, 8.66 grams of Capa 2054, 1.33 grams of Tinuvin 292, 5.24 grams of Cosorb MOH, and 0.0024 grams of Metacure T-12 were added. The mixture was agitated for 20 minutes until it was homogeneous. Desmodur N 3390 (17 grams) was added into 100 grams of the solution mixture and the combined ingredients were then stirred for 10 minutes. The solution was coated on a melamine-acrylic coated releasable polyester carrier web at about a 1 mil (0.03 mm) wet thickness to obtain a 0.4 mil (0.001 mm) dry thickness. The coating was dried and partially cured for 30 seconds at 150° F. (66° C.), 30 seconds at 225° F. (107° C.) and 30 seconds at 265° F. (129° C.).

Bayhydrol 122 (100 grams) was placed into a glass jar along with 0.2 grams of AMP 95, 1.6 grams of Cosorb OSG, 1.3 grams of Tinuvin 292, 8.0 grams of butyl carbitol, and 0.2 grams of Triton GR-7M. De-ionized water was added into the solution mixture to control the solution viscosity to between 100 centipoise (100 mPa-sec) and 200 centipoise (200 mPa-sec). Prior to coating, 3.0 grams of Neocryl CX-100 was added into 100 grams of the prepared solution mixture. The water-based solution was agitated for 10 minutes and was then coated onto the above partially cured solvent-based coating at a 50 micrometer wet thickness to obtain a 13 micrometer dry thickness. The coating was dried and cured for 30 seconds at 175° F. (79° C.), 30 seconds at 245° F. (118° C.) and 30 seconds at 285° F. (141° C.).

Preparation of Clear Coat 202

Alberdingk U 933 (83.78 grams) was placed into a glass jar along with 8.47 grams of butyl carbitol, 0.3 grams of Triton GR-7M, 0.03 grams of AMP 95, 1.08 grams of Cosorb OSG, and 0.45 grams of Tinuvin 123 and agitated for 10 minutes. The solution mixture was diluted with de-ionized water and its viscosity was kept to between 50 centipoise (50 mPa-sec) and 120 centipoise (120 mPa-sec). Neocryl CX-100 (1.78 grams) was added to 100 grams of the coating mixture solution prior to coating. The solution was coated at a 50-micrometer wet thickness on a standard polyester carrier web to obtain about a 13 micrometer dry thickness. The coating was dried and cured for 30 seconds at 175° F. (79° C.), 30 seconds at 245° F. (118° C.) and 30 seconds at 285° F. (141° C.).

Preparation of Clear Coat 203

Clear Coat 203 was prepared by mixing Part A and Part B of Formulation 204 (shown in Table 202) at a 1:1 ratio of Part A to Part B using an in-line static mixer, and coated according to Film Coating Procedure 200 above. The coating (38 micrometer thickness) was sandwiched between two T10 release liners, resulting in a partially cured transparent film. One of the liners was removed leaving an exposed polyurethane transparent layer.

Preparative Example 201

Part A was made using the following procedure. Charges 1 to 4 of Formulation 201 were added into a glass jar and agitated. The mixture was then heated to 100° C. Charges 5 to 8 were then added while the temperature was still at about 100° C., and then agitated thoroughly to make sure all the ingredients were well dissolved in the mixture. After all the ingredients were dissolved, charge 9 was added into the mixture and agitated for about 10 minutes to make sure the mixture was uniformly mixed. The resultant black resin mixture was vacuum-degassed at 60° C. for at least 12 hours.

Part B of Formulation 201 was prepared by mixing charges 10 to 12, and agitating the mixture for 1 hour at 70° C.

Part A was mixed with the Part B in a 1:1 ratio using an in-line static mixer, and coated between the Clear Coat 201 and T10 release liner (100 micrometer thickness) according to Film Coating Procedure 200 above.

The resulting opaque color layer/transparent clear layer composite film (between liners) was prepared for testing according to the Film Preparation for Testing Procedure described above. Results are reported in Table 203.

Preparative Example 202

Preparative Example 202 was carried out as in Preparative Example 201, except that Clear Coat 202 was used instead of Clear Coat 201. The resulting opaque color layer/transparent clear layer composite film (between liners) was prepared for testing according to the Film Preparation for Testing Procedure described above. Results are reported in Table 203.

Preparative Example 203

Preparative Example 203 was carried out as in Preparative Example 201, except that Part A and Part B of Formulation 202 were used instead of Parts A and B from Preparative Example 201. The resulting opaque color layer/transparent clear layer composite film (between liners) was prepared for testing according to the Film Preparation for Testing Procedure described above. Physical property test results are reported in Table 203. The environmental cycling test results are reported in Table 204.

Preparative Example 204

Preparative Example 204 was carried out as in Preparative Example 203, except that Clear Coat 202 was used instead of Clear Coat 201. The resulting opaque color layer/transparent clear layer composite film (between liners) was prepared for testing according to the Film Preparation for Testing Procedure described above. Physical property test results are reported in Table 203. The environmental cycling test results are reported in Table 204.

Preparative Example 205

Preparative Example 205 was carried out as in Preparative Example 203, except that Part A and Part B of Formulation 203 were used instead of Parts A and B from Preparative Example 201. The resultant opaque color layer/transparent clear layer composite film (between liners) was prepared for testing according to the Film Preparation for Testing Procedure. Physical property test results are reported in Table 203. The environmental cycling test results are reported in Table 204.

Preparative Example 206

Example 206 was carried out as in Preparative Example 205, except that Clear Coat 202 was used instead of Clear Coat 201. The resulting opaque color layer/transparent clear layer composite film (between liners) was prepared for testing according to the Film Preparation for Testing Procedure described above. Physical property test results are reported in Table 203. The environmental cycling test results are reported in Table 204.

Preparative Example 207

Preparative Example 207 was carried out as in Preparative Example 201, except that two T10 release liners were used (no clear coat). The resulting opaque color layer film (between liners) was prepared for testing according to the Film Preparation for Testing Procedure described above. Physical property test results are reported in Table 203.

Preparative Example 208

Preparative Example 208 was carried out as in Example 203, except that both liners were T10 release liners. The resulting opaque color layer film (between two T10 release liners) was prepared for testing according to the Film Preparation for Testing Procedure described above. Physical property test results are reported in Table 203.

Preparative Example 209

Preparative Example 209 was carried out as in Example 205, except that both liners were T10 release liners. The resulting opaque color layer film (between liners) was prepared for testing according to the Film Preparation for Testing Procedure described above. Physical property test results are reported in Table 203.

Preparative Example 210

Preparative Example 210 was carried out as in Preparative Example 201 except that Part A and Part B of Formulation 204 were used instead of Parts A and B from Preparative Example 201. The resulting opaque color layer/transparent clear layer composite film (between liners) was prepared for testing according to the Film Preparation for Testing Procedure described above. Physical property test results are reported in Table 203.

Preparative Example 211

Preparative Example 211 was carried out as in Preparative Example 210, except that Clear Coat 202 was used instead of Clear Coat 201. The resulting opaque color layer/transparent clear layer composite film (between two T10 release liners) was prepared for testing according to the Film Preparation for Testing Procedure described above. Physical property test results are reported in Table 203.

Preparative Example 212

Preparative Example 212 was carried out as in Preparative Example 210, except that two T10 release liners were used (no clear coat). The resulting opaque color layer film (between two T10 release liners) was prepared for testing according to the Film Preparation for Testing Procedure described above. Physical property test results are reported in Table 203. The environmental cycling test results are reported in Table 204.

Preparative Example 213

Preparative Example 213 was carried out as in Preparative Example 201, except that Clear Coat 3 was used in place of Clear Coat 1, and Part A and Part B of the polyurethane color layer were prepared according to Formulation 204 instead of Preparative Example 201. The resulting opaque color layer/transparent clear layer composite film (between liners) was prepared for testing according to the Film Preparation for Testing Procedure described above. Physical property test results are reported in Table 203.

Preparative Example 214

Preparative Example 214 was carried out as in Preparative Example 203, except that Clear Coat 3 was used in place of Clear Coat 1. The resulting opaque color layer/transparent clear layer composite film composite paint film (between liners) was prepared for testing according to the Film Preparation for Testing Procedure described above. Physical property test results are reported in Table 203 below.

TABLE 203

| Film of Preparative Example | Elongation at break, % | Metal Bending Test | Erichsen Scratch/Indentation Resistance Test, 5N rating |
|---|---|---|---|
| 201 | too brittle to measure | fail | NA |
| 202 | too brittle to measure | fail | NA |
| 203 | 213 | pass | 4 |
| 204 | 303 | pass | 5 |
| 205 | 188 | pass | 3 |
| 206 | 323 | pass | 3 |
| 207 | too brittle to measure | fail | NA |
| 208 | 341 | pass | 3 |
| 209 | 829 | pass | 3 |
| 210 | 167 | pass | 5 |
| 211 | 152 | pass | 5 |
| 212 | 85 | pass | 6 |
| 213 | 199 | pass | 6 |
| 214 | 198 | pass | 4 |

TABLE 204

| Film of Preparative Example | Environmental Cycling Test |
|---|---|
| 203 | Pass |
| 204 | Pass |
| 205 | Pass |
| 206 | Pass |
| 212 | Pass |

Preparative Example 215

Preparative Example 215 was carried out as in Preparative Example 201, except that Part A and Part B of Formulation 204 were used and Part B used Desmodur N 3600 instead of Desmodur N 3300A, and two T10 release liners were used (no clear coat). The resulting opaque color layer film (between liners) was prepared for testing according to the Film Preparation for Testing Procedure described above. The resulting film was subjected to 1220 kilojoules of accelerated weathering exposure. After weathering exposure, the 60 degrees gloss change was less than 1% and the color shift (ΔE) was 0.37. The Scratch Resistance test results are reported in Table 205 below.

TABLE 205

| | Erichsen Scratch Resistance | | | | |
|---|---|---|---|---|---|
| Time after | Test Rod Setting, Newtons | | | | |
| Scratch/Indent | 2 | 5 | 7.5 | 10 | 15 |
| 5 min | 5 | 4 | 3 | 2 | 1 |
| 3 hours | 6 | 5 | 4 | 3 | 2 |
| 16 hours | 6 | 5 | 4 | 3 | 2 |
| 22 days | 6 | 6 | 5 | 4 | 3 |

Example 201

Example 201 was carried out as in Preparative Example 215, except that aluminum AL6111 sheet metal was used in place of the Clear Coat 201 coated liner. 4 inch×1 inch (10 cm×1.3 cm) coupons of the resulting film/sheet metal composite were used for the metal bending test. 4 inch×4 inch (10 cm×10 cm) coupons of the film/sheet metal composite were used for the Gardner Impact Test. Test results are reported in Table 206 below.

Example 202

Example 202 was carried out as in Example 201, except that cold rolled steel C1008 sheet metal was used instead of aluminum AL6111 sheet metal. Test results are reported in Table 206.

Example 203

Example 203 was carried out as in Example 201, except that stainless steel 304 sheet metal was used instead of aluminum AL6111 sheet metal. Results are reported in Table 206 below.

TABLE 206

| | Metal | Gardner Impact Test | |
|---|---|---|---|
| Example | Bending Test | 23° C., 2.8 J | −29° C., 0.6 J |
| 201 | pass | pass | pass |
| 202 | pass | pass | pass |
| 203 | pass | pass | pass |

Series 300 Examples

Metal Substrates

The following two metal sheets were used as substrates for Examples 302-306: aluminum sheet (0.02 inch (05 mm) thick, Alclad, obtained from Alcan Corporation, Montreal, QC, Canada, and coated with EC3960 epoxy primer available from 3M Company, St. Paul, Minn.); aluminum sheet (1 mm thick, Alcan, obtained from ACT Laboratories, Hillsdale, Mich., A16111T43, unpolished, 10 cm by 30 cm coated with APU 1014. The APU 1014 coated aluminum was prepared using a #34 Meyer rod (nominal wet coating thickness=0.078 mm) followed by drying for 24 hours at room temperature.

Examples 301A and 301B

K-Flex 188 (108.0 grams), 12.0 grams Tone 2221, and 6.0 grams of Ferro Black were added to a plastic beaker and degassed in a vacuum oven (30 inches of Hg (100 kPa) vacuum), for 30 minutes, at 80° C. The diol mixture was cooled to ambient temperature and 90.12 grams of Desmodur N 3300A was added and stirred by hand for approximately one minute. Dabco T-12 catalyst (0.315 grams) was then added and the combined ingredients were mixed for 15 seconds, and then immediately coated between a metal bottom sheet and a top siliconized liner (63 micrometer polyester release liner obtained from CPFilms Inc., Martinsville, Va.) using a conventional lab-scale knife coating apparatus, which was nominally gauged for a film thickness of 0.3 mm. The two aluminum substrates described above in the section Metal Substrates were coated with the catalyzed diol mixture. The 0.5 mm Alclad was used for Example 302A and the 1.0 mm Alcan was used for Example 302B.

The coated metal sheets were placed in an oven at 80° C. for 24 hours and then removed and placed at ambient temperature for an additional week. A cross hatch test was performed using ASTM test method D3359-07 "Standard Test Methods for Measuring Adhesion by Tape Test, Method B, with 3M Scotch Filament Tape 898 (3M Company, St. Paul, Minn.). 100% adhesion was observed after removal of the 898 tape for both aluminum samples.

The above film/sheet metal laminates (Examples 302A and 302B) were cut into 1-inch (2.5-cm) strips and a Bending Break press (obtained from Brown Boggs, Hamilton, ON) was used to bend the samples at angles of +90°, −90°, and 180°. Both Examples 302A and 302B survived the +90°/−90° test, although Example 302A exhibited a tear along the 180° seam. A tear was not observed for the 180° test for Example 302B.

Example 302

PC-1667 (8.50 grams) was blended with 8.50 grams of K-Flex 188 in a plastic beaker. The mixture was degassed in a vacuum oven (30 inches of Hg (100 kPa) vacuum) for 30 minutes at 80° C. The mixture was cooled to 50° C. and 9.94 grams of Desmodur N 3300A was added and then stirred by hand for approximately one minute, after which 0.040 grams of Dabco T-12 was added and the combined ingredients were then mixed for 15 seconds and immediately coated between a top silicone-coated PET liner (63 micrometer polyester release liner obtained from CPFilms Inc., Martinsville, Va.) and a bottom silicone-coated paper liner, using a conventional lab-scale knife coating apparatus, which was nominally gauged for a coating thickness of 127 micrometer. The coated film/liner laminate was placed in an oven at 80° C. for 24 hours prior to testing.

Hot-Melt Adhesive on paper liner: A 0.30 mil (8 micrometers) thick layer of Macromelt 6240, supplied on a silicone coated paper liner.

Blend: 9.30 grams of 4298 UV was placed in a glass sample jar. Hot-melt adhesive, Macromelt 6240, 0.13 g, was added and shaken until dissolved. A silicone coated paper liner was coated with the solution using a #32 Meyer rod. The casting was allowed to dry at room temperature, then additionally for 2 hours at 80° C. The adhesive thickness was measured with a micrometer to be 0.64 mil (16 micrometers) thick.

4298 UV: A silicone coated paper liner was coated with the adhesion promoter using a #75 Meyer rod (1.9 mm nominal wet thickness). The casting was allowed to dry at room temperature, then additionally for 2 hours at 80° C. The adhesive thickness was measured with a micrometer to be 0.60 mil (15 micrometers) thick.

Polished AK 434 Stainless Steel obtained from AK Steel, West Chester, Ohio, was cut into 1 inch×4 inches×47 mils (2.5 cm×10 cm×1.2 mm) coupons and pre-washed with a methyl ethyl ketone (MEK) wipe, allowed to dry for 5 minutes and then one-half of the samples were wiped with a primer solution of 4298 UV. The coupons were allowed to dry for approximately 5 minutes and then placed in a convection oven preset to 70° C. Strips of tape (15 mm length) were cut to 8-inch (20-cm) lengths and applied to the heated Stainless Steel coupons with a squeegee to ensure no air entrapment (minimal pressure). The coupons were immediately removed and allowed to cool to ambient temperature. Heating plates were set to 140° C. and 200° C., and the coupons were placed one at a time onto the surface for 15 seconds. This design provided approximately 10 seconds at temperature. The coupons were removed and immediately placed on a cold plate to quench. The samples were tested on an Instron Model 4400R Norwood, Mass. (180° peel) within 4 hours at a rate of 12 inches/minute (30 cm/min). Results are reported in Table 305 below.

TABLE 305

| Primer | Adhesive | Peel Force, pounds per lineal inch (N/cm) | |
|---|---|---|---|
| | | 140° C. | 200° C. |
| None | Macromelt | 0.90 (1.6) | 2.65 (4.64) |
| 4298UV | Macromelt | 1.48 (2.59) | 3.72 (6.51) |
| None | 4298UV | 0.60 (1.1) | 0.70 (1.2) |
| 4298UV | 4298UV | 4.19 (7.3) | 4.55 (7.97) |
| 4298UV | None | 0.19 (0.33) | 0.14 (0.25) |
| None | Blend | 0.52 (0.91) | 0.84 (1.5) |
| 4298UV | Blend | 8.86 (15.5) | 4.42 (7.74) |

Characterization of Solvent-Based Paint-Film Polyurethanes as Prepared in a Pan

The following experiments demonstrate the effect of including solvent on the density and glass transition of paint film polyurethane compositions produced by reacting a polyester polyol and a polyisocyanate. The solvents used in this study include toluene, ethyl acetate, MIBK (methyl isobutyl ketone), and THF (tetrahydrofuran). The solvents were dried over 4 angstrom molecular sieves for 24 hours and water determination was performed by Karl Fischer titration prior to use.

The general method for preparing each trial was conducted as follows. K-FLEX 188 (100% active polyester polyol, King Industries, Norwalk, Conn.) was added to a plastic beaker and degassed in a vacuum oven (30 in. Hg vacuum, 0.76 m Hg vacuum) for 30 minutes at 80° C. The polyol was then cooled to ambient temperature. For the examples, which contained solvent, the polyol and solvent were blended with a stir stick until a homogeneous mixture was formed. The catalyst DABCO T12 (dibutyltin dilaurate, Air Products, Allentown, Pa.) was added to the cup, followed by mixing by hand. DESMODUR N3300 (HDI (1,6-hexamethylene diisocyanate) trimer from Bayer Corporation, Pittsburgh, Pa.) was added at the desired level, mixed for 15 seconds by hand, and then mixed using the SPEED MIXER DAC 150 FVZ., (Flack-Tek Inc., Landrum, S.C.) for 15 seconds, at 3600 rpm. Note that DESMODUR W (dicyclohexylmethane-4,4'-diisocyanate from Bayer Corporation, Pittsburgh, Pa.) was used for selected samples in this study.

When mixing was completed, 12.0 g of each sample was poured into aluminum weighing dishes. The individual samples were placed in a fume hood with an inverted plastic beaker over the aluminum pan. The samples were left undisturbed for 48-60 hrs before analysis, or further conditioned at 70° C., or at 120° C. The data for density, glass transition temperature ($T_g$), and percent weight loss is recorded in Tables S2-S4.

TABLE S1

| SAMPLE | SOLVENT | SOLVENT, parts | K-FLEX 188, parts | DESMODUR N3300, parts | DESMODUR W, parts | DABCO T12, parts |
|---|---|---|---|---|---|---|
| S1A | control | 0 | 12.80 | 11.61 | 0 | 0.04 |
| S1B | control | 0 | 13.16 | 11.24 | 0 | 0.04 |
| S1C | 5% toluene | 1.25 | 12.60 | 11.24 | 0 | 0.04 |

TABLE S1-continued

| SAMPLE | SOLVENT | SOLVENT, parts | K-FLEX 188, parts | DESMODUR N3300, parts | DESMODUR W, parts | DABCO T12, parts |
|---|---|---|---|---|---|---|
| S1D | 10% toluene | 2.56 | 12.0 | 10.91 | 0 | 0.03 |
| S1E | 10% toluene | 2.56 | 12.51 | 10.38 | 0 | 0.03 |
| S1F | 30% toluene | 7.36 | 9.23 | 8.29 | 0 | 0.03 |
| S1G | 50% toluene | 12.41 | 6.47 | 5.93 | 0 | 0.03 |
| S1H | 5% ethyl acetate | 1.30 | 12.55 | 11.45 | 0 | 0.04 |
| S1I | 10% ethyl acetate | 2.56 | 12.07 | 11.01 | 0 | 0.03 |
| S1J | 10% ethyl acetate | 2.55 | 12.55 | 10.43 | 0 | 0.03 |
| S1K | 30% ethyl acetate | 7.43 | 9.07 | 8.25 | 0 | 0.03 |
| S1L | 50% ethyl acetate | 12.48 | 6.53 | 6.00 | 0 | 0.02 |
| S1M | 5% MIBK | 1.28 | 12.55 | 11.44 | 0 | 0.04 |
| S1N | 10% MIBK | 2.60 | 12.03 | 10.92 | 0 | 0.03 |
| S1O | 10% MIBK | 2.55 | 12.50 | 10.45 | 0 | 0.03 |
| S1P | 30% MIBK | 7.40 | 9.02 | 8.24 | 0 | 0.03 |
| S1Q | 50% MIBK | 12.42 | 6.50 | 5.93 | 0 | 0.02 |
| S1R | 5% THF | 1.27 | 12.50 | 11.52 | 0 | 0.04 |
| S1S | 10% THF | 2.55 | 12.01 | 10.91 | 0 | 0.03 |
| S1T | 10% THF | 2.56 | 12.55 | 11.61 | 0 | 0.03 |
| S1U | 30% THF | 7.39 | 9.00 | 8.21 | 0 | 0.03 |
| S1V | 50% THF | 12.49 | 6.54 | 5.92 | 0 | 0.02 |
| S1W | control | 0 | 15.57 | 0 | 9.61 | 0.04 |
| S1X | control | 0 | 16.05 | 0 | 9.04 | 0.04 |
| S1Y | 10% ethyl acetate | 2.53 | 14.08 | 0 | 8.72 | 0.03 |
| S1Z | 10% ethyl acetate | 2.52 | 14.57 | 0 | 8.22 | 0.03 |

$T_g$ measurements reported in Table S2 were determined by differential scanning calorimetry (DSC) using a TA Instruments differential scanning calorimeter Model Q100 using crimped aluminum sample pans. The following protocol was used for first and second cycle: First Cycle: ramp from room temp to −60° C. at 20° C./min; ramp from −60° C. to 80° C. at 20° C./min; and Second Cycle: ramp from 80° C. to −60° C. at 50° C./min; ramp from −60° C. to 80° C. at 20° C./min. The densities were determined using the Archimedes method. In Tables S2 and S3, * indicates a poor baseline from which to calculate data. In Table S4, ** indicates no data due to excessive foaming of sample.

TABLE S2

| SAMPLE | SOLVENT | DENSITY, grams/mL | $T_g$ by DSC, °C. | Percent (%) weight loss, 60 hrs at Room Temperature (RT) |
|---|---|---|---|---|
| S1A | control | 1.180 | 31.43 | 0.05 |
| S1B | control | 1.175 | 32.75 | 0.03 |
| S1C | 5% toluene | 1.160 | 14.07 | 0.01 |
| S1D | 10% toluene | 1.146 | −1.47 | −0.08 |
| S1E | 10% toluene | 1.141 | −2.50 | −0.02 |
| S1F | 30% toluene | 1.108 | −18.87 | −4.19 |
| S1G | 50% toluene | 1.105 | −22.04 | −16.60 |
| S1H | 5% ethyl acetate | 1.160 | 1.2 | −0.01 |
| S1I | 10% ethyl acetate | 1.148 | −12.67 | −0.16 |
| S1J | 10% ethyl acetate | 1.150 | −11.98 | −0.08 |
| S1K | 30% ethyl acetate | 1.122 | −8.43 | −6.29 |
| S1L | 50% ethyl acetate | 1.126 | −20.06 | −17.11 |
| S1M | 5% MIBK | 1.154 | 8.08 | −0.01 |
| S1N | 10% MIBK | 1.133 | −8.95 | −0.07 |
| S1O | 10% MIBK | 1.132 | −8.88 | −0.03 |
| S1P | 30% MIBK | 1.076 | −15.72 | −3.81 |
| S1Q | 50% MIBK | 1.064 | −18.72 | −15.87 |
| S1R | 5% THF | 1.158 | 6.96 | −0.03 |
| S1S | 10% THF | 1.143 | −5.07 | −0.04 |
| S1T | 10% THF | 1.147 | −2.39 | −0.07 |
| S1U | 30% THF | 1.112 | −22.79 | −4.96 |
| S1V | 50% THF | 1.112 | −26.78 | −16.73 |
| S1W | control | 1.138 | * | 0.02 |
| S1X | control | 1.141 | * | 0.03 |
| S1Y | 10% ethyl acetate | 0.876 | 9.85 | −0.27 |
| S1Z | 10% ethyl acetate | 0.937 | 7.12 | −0.05 |

TABLE S3

| SAMPLE | SOLVENT | DENSITY, grams/mL | $T_g$ by DSC, °C. | PERCENT WEIGHT LOSS, 36 hrs at RT, 24 hrs at 70° C. |
|---|---|---|---|---|
| S1A | control | 1.179 | 28.07 | −0.01 |
| S1B | control | 1.178 | * | 0.01 |
| S1C | 5% toluene | 1.163 | 10.89 | −0.26 |
| S1D | 10% toluene | 1.148 | −2.41 | −0.91 |
| S1E | 10% toluene | 1.146 | −2.15 | −0.57 |
| S1F | 30% toluene | 1.127 | −5.86 | −8.38 |
| S1G | 50% toluene | 1.122 | −5.22 | −20.47 |
| S1H | 5% ethyl acetate | 1.168 | 3.80 | −0.17 |
| S1I | 10% ethyl acetate | 1.158 | −2.00 | −1.10 |
| S1J | 10% ethyl acetate | 1.154 | −6.97 | −1.00 |
| S1K | 30% ethyl acetate | 1.146 | −9.04 | −9.80 |
| S1L | 50% ethyl acetate | 1.153 | −14.94 | −20.48 |
| S1M | 5% MIBK | 1.154 | 9.46 | −0.04 |
| S1N | 10% MIBK | 1.133 | −4.71 | −0.74 |
| S1O | 10% MIBK | 1.134 | −8.36 | −0.61 |
| S1P | 30% MIBK | 1.107 | −22.68 | −7.99 |
| S1Q | 50% MIBK | 1.108 | −14.98 | −21.10 |
| S1R | 5% THF | 1.160 | 9.30 | −0.16 |
| S1S | 10% THF | 1.152 | −5.22 | −0.70 |
| S1T | 10% THF | 1.149 | −4.32 | −0.59 |
| S1U | 30% THF | 1.135 | −8.31 | −8.52 |
| S1V | 50% THF | 1.137 | −18.42 | −19.74 |
| S1W | control | 1.084 | * | −0.06 |
| S1X | control | 1.131 | * | −0.2 |
| S1Y | 10% ethyl acetate | 0.497 | 38.60 | −0.91 |
| S1Z | 10% ethyl acetate | 0.837 | 10.99 | −0.48 |

TABLE S4

| SAMPLE | SOLVENT | DENSITY, grams/mL | $T_g$ by DSC, °C. | PERCENT WEIGHT LOSS, 60 hrs at RT, 24 hrs at 120° C. |
|---|---|---|---|---|
| S1A | control | 1.176 | 38.23 | −0.05 |
| S1B | control | 1.177 | * | −0.02 |
| S1C | 5% toluene | 1.172 | 34.89 | −1.20 |
| S1D | 10% toluene | 1.165 | 23.26 | −2.86 |
| S1E | 10% toluene | 1.152 | 2.27 | −1.39 |
| S1F | 30% toluene | 1.148 | 15.28 | −12.91 |
| S1G | 50% toluene | 1.163 | 32.34 | −23.65 |
| S1H | 5% ethyl acetate | 1.167 | 16.14 | −0.76 |
| S1I | 10% ethyl acetate | 1.166 | 22.74 | −3.39 |
| S1J | 10% ethyl acetate | 1.152 | 16.50 | −3.08 |
| S1K | 30% ethyl acetate | 1.152 | 33.10 | −13.24 |
| S1L | 50% ethyl acetate | 1.170 | 23.99 | −22.87 |
| S1M | 5% MIBK | 1.162 | 18.51 | −0.96 |
| S1N | 10% MIBK | 1.153 | 4.18 | −2.25 |
| S1O | 10% MIBK | 1.143 | 10.58 | −2.29 |
| S1P | 30% MIBK | 1.153 | 22.59 | −13.82 |
| S1Q | 50% MIBK | 1.160 | 23.05 | −23.55 |
| S1R | 5% THF | 1.173 | 22.44 | −0.90 |
| S1S | 10% THF | 1.165 | 11.86 | −2.38 |
| S1T | 10% THF | 1.153 | 6.98 | −2.49 |
| S1U | 30% THF | 1.153 | 7.94 | −12.39 |
| S1V | 50% THF | 1.164 | 16.17 | −22.54 |
| S1W | control | 0.985 | * | −0.06 |
| S1X | control | 0.996 | * | −0.04 |
| S1Y | 10% ethyl acetate | ** | ** | ** |
| S1Z | 10% ethyl acetate | ** | ** | ** |

Characterization of Solvent-Based Polyurethane Paint-Films when Cast on One Liner or Between Two Liners This experiment demonstrates the influence of incorporating solvent on the surface topology of polyurethane paint films, when cast on one liner, or between two liners. The films were prepared according to the compositions reported in Table T1. K-FLEX 188, (100% active polyester polyol) was added to a plastic beaker and degassed in a vacuum oven (30 in. Hg vacuum, 0.76 m Hg vacuum) for 30 minutes at 80° C. The polyol was cooled to ambient temperature and solvent, if used, was added and blended with a stir stick until a homogeneous mixture was formed. The catalyst DABCO T12 (dibutyltin dilaurate) was added to the cup, followed by mixing by hand. DESMODUR N3300 (HDI trimer) was added at the desired level, mixed for 15 seconds by hand, and then mixed using the SPEED MIXER DAC 150 FVZ mixer for 15 seconds, at 3600 rpm. The reactive composition was then immediately coated between a top and bottom silicone poly-liner (2.5 mil (0.064 mm) polyester release liner supplied by CPFilms Inc., Martinsville, Va.) using a lab-scale knife coat station, which was nominally gauged for a film thickness of 0.3 mm; or coated on a silicone poly-liner with a no. 32 Meyer rod; or on PET.

TABLE T1

| SAMPLE | K-FLEX 188, parts | Solvent 1 toluene, parts | Solvent 2 ethyl acetate, parts | Solvent 3 water, parts | DABCO T12, parts | DESMODUR N3300, parts |
|---|---|---|---|---|---|---|
| T1A | 12.0 | 0 | 0 | 0 | 0.01 | 12.0 |
| T1B | 12.0 | 0 | 0 | 0.02 | 0.01 | 12.0 |
| T1C | 12.0 | 2.4 | 0 | 0 | 0.01 | 12.0 |
| T1D | 12.0 | 0 | 2.4 | 0 | 0.01 | 12.0 |

The samples were dried at ambient temperature for 24 hours. Surface roughness was measured using a MITUTOYO SURFTEST SJ-401 stylus type profilometer (Mississauga, ON). Results are reported in Table T2.

TABLE T2

| SAMPLE | SOLVENT | LINER TYPE | NUMBER OF LINERS | MEASURED SIDE | $R_a$, micrometers (average surface) | $R_z$, micrometers (average deepest) | OBSERVATIONS |
|---|---|---|---|---|---|---|---|
| T1A | none | silicone poly-liner | 1 | air | 0.06 | 0.3 | smooth |
| T1A | none | silicone poly-liner | 1 | liner | 0.10 | 0.5 | smooth |
| T1A | none | silicone poly-liner | 2 | liner | 0.04 | 0.4 | smooth |
| T1B | water | silicone poly-liner | 2 | liner | 0.04 | 0.4 | some bubbles |
| T1C | toluene | silicone poly-liner | 1 | air | 0.25 | 2.0 | rough to touch |

TABLE T2-continued

| SAMPLE | SOLVENT | LINER TYPE | NUMBER OF LINERS | MEASURED SIDE | $R_a$, micrometers (average surface) | $R_z$, micrometers (average deepest) | OBSERVATIONS |
|---|---|---|---|---|---|---|---|
| T1C | toluene | silicone poly-liner | 1 | liner | 0.08 | 1.0 | smooth |
| T1C | toluene | silicone poly-liner | 2 | liner | 0.35 | 3.3 | bubbles trapped between liners |
| T1D | ethyl acetate | pet | 1 | air | 1.04 | 5.1 | rough to touch |
| T1D | ethyl acetate | silicone poly-liner | 2 | liner | 0.12 | 0.6 | bubbles trapped between liners |

Characterization of Solvent-Based Polyurethane Film Coated Between Two Liners

These experiments demonstrate the influence of incorporated solvent on both color and bubble defects for solvent-based, urethane paint film compositions. Toluene, the solvent used for these experiments, was first dried over molecular sieves to less than 10 ppm of water and was added to the formulations at levels ranging from 0.10%-50%, by weight of total formulation.

The general method of sample preparation Table U1 (A-L) was conducted as follows. K-Flex 188 (100% active polyester polyol) was added to a plastic beaker and degassed in a vacuum oven (30 in. Hg vacuum, 0.76 m Hg vacuum) for 30 minutes at 80° C. The polyol was then cooled to ambient temperature. For the examples, which contained solvent, the polyol and solvent were blended together with a stir stick until a homogeneous mixture was formed. The catalyst DABCO T12 (dibutyltin dilaurate) was added to the cup, followed by mixing by hand. DESMODUR N3300 (HDI trimer) was added at the desired level, mixed for 15 seconds by hand, and then mixed using the SPEED MIXER DAC 150 FVZ (Flack-Tek, Inc., Landrum, S.C.), for 15 seconds, at 3600 rpm. The reaction mixture was immediately coated between two silicone coated PET liners (2.5 mil (0.64 mm) polyester release liner supplied by CPFilms Inc.), which were prepared as follows. The bottom PET liner was lined with two strips of 6 mil 3M ACRYLIC PLUS TAPE PT 1100 (double-coated acrylic foam tape) to provide caliper control. The reactive composition was poured onto the bottom liner and the top liner was applied with a metal bar so as to provide for a rolling bank of material. The films prepared in this manner were dried at ambient temperature for 24 hours and then further cured at 80° C. for 24 hours. The film color rating is reported in Table U1 using the following rating scale: 0=clear, 1=very slight yellow, 2=noticeable yellow, 3=very yellow.

TABLE U1

| SAMPLE | K-FLEX 188, parts | TOLUENE, parts | DABCO T12, parts | DESMODUR N3300, parts | FILM COLOR RATING after 80° C. for 24 hr |
|---|---|---|---|---|---|
| U1A | 15.59 | 0 | 0.04 | 14.29 | 0 |
| U1B | 15.50 | 0 | 0.04 | 12.92 | 0 |
| U1C | 15.58 | 0 | 0.05 | 15.65 | 2 |
| U1D | 15.60 | 0.04 | 0.04 | 14.26 | 0 |
| U1E | 15.55 | 0.08 | 0.04 | 14.16 | 1 |
| U1F | 15.58 | 0.16 | 0.04 | 14.26 | 2 |
| U1G | 15.56 | 0.22 | 0.04 | 14.22 | 1 |
| U1H | 15.56 | 0.30 | 0.04 | 14.23 | 2 |
| U1I | 15.52 | 0.60 | 0.04 | 14.16 | 2 |
| U1J | 15.57 | 1.56 | 0.04 | 14.24 | 3 |
| U1K | 15.50 | 1.50 | 0.04 | 13.00 | 0 |
| U1L | 15.54 | 1.63 | 0.04 | 15.51 | 3 |

The samples in Table U2 (U2A-U2J) were prepared as described above for samples U1A-U1L. The films were immediately cut into 3-equal pieces: one portion placed at ambient temperature, one portion placed into a 70° C. oven for 15 minutes, and one portion placed into a 120° C. oven for 15 minutes. Data for film formation and for the films conditioned at each temperature for 15 minutes is recorded in the following table. The effect of increased temperature caused pronounced defects with respect to bubble formation for all samples with the exception of sample U2A.

TABLE U2

| SAMPLE | K-FLEX 188, parts | TOLUENE, parts | DABCO T12, parts | DESMODUR N3300, parts | FILM AGING AFTER 15 MINUTES RT | FILM AGING AFTER 15 MINUTES AT 70° C. | FILM AGING AFTER 15 MINUTES AT 120° C. |
|---|---|---|---|---|---|---|---|
| U2A | 15.53 | 0 | 0.04 | 14.63 | clear | clear | clear |
| U2B | 15.54 | 0.16 | 0.04 | 14.14 | clear | very, very few tiny bubbles | large bubbles on tape; many tiny bubbles |
| U2C | 15.52 | 0.30 | 0.04 | 14.20 | moderate number of tiny bubbles | many tiny bubbles | large bubbles on tape; moderate tiny bubbles |
| U2D | 15.51 | 0.61 | 0.04 | 14.20 | moderate number of tiny bubbles | many tiny bubbles | large bubbles on tape; few tiny bubbles |
| U2E | 15.02 | 0.90 | 0.04 | 13.64 | moderate number of tiny bubbles | some spots on tape; many tiny bubbles | large bubbles on tape and slightly foamy; many tiny bubbles |
| U2F | 15.05 | 1.52 | 0.04 | 13.61 | moderate number of tiny bubbles | some spots on tape; many tiny bubbles | large bubbles on tape and slightly foamy; many, many tiny bubbles |
| U2G | 14.52 | 2.26 | 0.04 | 13.28 | moderate number of tiny bubbles | some spots on tape; many tiny bubbles | large bubbles on tape and slightly foamy; many, many tiny bubbles |
| U2H | 14.41 | 2.98 | 0.04 | 12.70 | moderate number of tiny bubbles | some spots on tape; many tiny bubbles | large bubbles on tape and slightly foamy; many, many tiny bubbles |
| U2I | 11.06 | 9.10 | 0.03 | 10.07 | some tiny bubbles | some spots on tape; many tiny bubbles | spots on tape wrinkled and cracked |
| U2J | 7.86 | 14.92 | 0.02 | 7.23 | huge bubbles in film | few large bubbles; some tiny bubbles | spots on tape wrinkled and cracked |

Shape Memory Testing

Specimens of the material prepared in Preparative Example 106 were evaluated by Dynamic Mechanical Analysis using a TA Instruments model DMA Q800 dynamic mechanical testing apparatus. The material exhibited a tan delta peak temperature ($T_g$) of 38° C., had a tensile storage modulus (E') of 1900 megapascals (MPa) at $T_g$-40° C. (-2° C.), and had a tensile storage modulus (E') of 6 MPa at $T_g$+40° C. (78° C.). A specimen of the material (having the dimensions of length=7.2 mm, width 6.1 mm, and height=0.45 mm) was subjected to three strain-recovery cycles to measure the shape memory of the material. The specimen was heated to 40° C., then a tensile force increasing at 2 newtons (N) per minute to a maximum of 8 N was applied (maximum strain=63%). The maximum tensile force was maintained while the sample was cooled to -20° C., where it became glassy. The tensile force was then relaxed at -20° C. The specimen was then reheated to 40° C. (with negligible tensile force) and the strain returned to 3%. The shape memory of the specimen became evident at about 25° C. The cycle was then repeated twice more, each time returning to 3% strain as compared to the original specimen.

Various modifications and alterations of this invention may be made by those skilled in the art without departing from the scope and spirit of this invention, and it should be understood that this invention is not to be unduly limited to the illustrative embodiments set forth herein.

What is claimed is:

1. A method of making a paint film composite, the method comprising:
    contacting a curable composition with a releasable first forming web and a releasable second forming web to form a rolling bank of the curable composition disposed at least partially between the first and second forming webs, the curable composition comprising a colorant and a curable polymeric material precursor, wherein the curable polymeric material precursor comprises one or more polyisocyanates and one or more compounds selected from the group consisting of polyols, polyamines, and aminoalcohols;
    passing at least a portion of each of the releasable first and second forming webs and the curable composition through a nip while said at least a portion of the curable composition is sandwiched between the releasable first and second forming webs to provide a curable layer precursor;
    at least partially curing the curable layer precursor to provide an opaque color layer comprising the colorant and a polymeric material comprising a polyurethane;
    separating the first forming web from the color layer; and
    permanently adhering the color layer to unpainted sheet metal with an adhesive while the second forming web is in contact with the color layer.

2. The method of claim 1, the polyurethane being extensible and having hard segments in an amount of from 30 to 70 percent by weight.

3. The method of claim 1, further comprising permanently deforming the paint film composite.

4. The method of claim 3, wherein said permanently deforming the paint film composite comprises roll forming or stamping.

5. The method of claim 1, wherein the adhesive is a pressure-sensitive adhesive.

* * * * *

UNITED STATES PATENT AND TRADEMARK OFFICE
CERTIFICATE OF CORRECTION

PATENT NO. : 8,932,424 B2  
APPLICATION NO. : 12/934038  
DATED : January 13, 2015  
INVENTOR(S) : Michael Johnson Page 1 of 1

It is certified that error appears in the above-identified patent and that said Letters Patent is hereby corrected as shown below:

Specification

Column 8  
Line 67, delete "m)" and insert -- mm) --, therefor.

Column 11  
Line 23, delete "polypropylene glycol)" and insert -- poly(propylene glycol) --, therefor.

Column 12  
Line 38, delete "hexahydrotoluoylenediamine," and insert -- hexahydrotoluylenediamine, --, therefor.

Column 29  
Line 60, delete "milliAmps" and insert -- milliAmps. --, therefor.

Column 33  
Lines 3-4, delete "calorimeter" and insert -- Calorimeter --, therefor.

Column 42  
Line 34, delete "(05" and insert -- (0.5 --, therefor.  
Line 39, delete "A16111T43," and insert -- A1 6111T43, --, therefor.

Column 48  
Line 13, delete "when" and insert -- When --, therefor.

Signed and Sealed this  
Twentieth Day of October, 2015

Michelle K. Lee  
*Director of the United States Patent and Trademark Office*